United States Patent
Keane et al.

(10) Patent No.: US 6,847,851 B1
(45) Date of Patent: Jan. 25, 2005

(54) APPARATUS FOR IMPROVED GENERAL-PURPOSE PID AND NON-PID CONTROLLERS

(75) Inventors: Martin A. Keane, Chicago, IL (US); John R. Koza, 25372 La Rena La., Los Altos Hills, CA (US) 94022; Matthew J. Streeter, San Jose, CA (US)

(73) Assignee: John R. Koza, Los Altos Hills, CA (US)

( * ) Notice: Subject to any disclaimer, the term of this patent is extended or adjusted under 35 U.S.C. 154(b) by 168 days.

(21) Appl. No.: 10/194,190

(22) Filed: Jul. 12, 2002

(51) Int. Cl.⁷ .............................................. G05B 13/02
(52) U.S. Cl. ............................ 700/42; 700/28; 700/37; 700/41; 318/609; 318/610
(58) Field of Search ............................ 700/28, 32, 37, 700/39, 40–41, 42; 318/609, 610

(56) References Cited

U.S. PATENT DOCUMENTS

| | | | |
|---|---|---|---|
| 2,175,985 A | | 10/1939 | Callendar |
| 4,231,825 A | * | 11/1980 | Carter ........................ 315/383 |
| 4,549,123 A | | 10/1985 | Hägglund et al. |
| 4,935,877 A | | 6/1990 | Koza |
| 5,069,453 A | | 12/1991 | Koza et al. |
| 5,112,050 A | | 5/1992 | Koza et al. |
| 5,136,686 A | | 8/1992 | Koza |
| 5,148,513 A | | 9/1992 | Koza et al. |
| 5,343,554 A | | 8/1994 | Koza et al. |
| 5,390,282 A | | 2/1995 | Koza et al. |
| 5,587,899 A | * | 12/1996 | Ho et al. ....................... 700/37 |
| 5,742,503 A | * | 4/1998 | Yu ............................... 700/42 |
| 5,742,738 A | | 4/1998 | Koza et al. |
| 5,867,397 A | | 2/1999 | Koza et al. |
| 6,058,385 A | | 5/2000 | Koza et al. |
| 6,081,751 A | * | 6/2000 | Luo et al. ...................... 700/42 |
| 6,264,111 B1 | * | 7/2001 | Nicolson et al. .............. 236/51 |
| 6,360,191 B1 | | 3/2002 | Koza et al. |
| 6,424,959 B1 | | 7/2002 | Bennett, III et al. |
| 6,438,431 B1 | * | 8/2002 | Wang et al. ................... 700/39 |
| 6,510,351 B1 | * | 1/2003 | Blevins et al. ................ 700/18 |
| 6,564,194 B1 | * | 5/2003 | Koza et al. .................... 706/13 |
| 6,577,908 B1 | * | 6/2003 | Wojsznis et al. .............. 700/42 |
| 6,697,767 B2 | * | 2/2004 | Wang et al. ................. 702/189 |

OTHER PUBLICATIONS

Astrom, Karl J. and Hagglund, Tore. 1995. *PID Controllers: Theory, Design, and Tuning.* Second Edition. Research Triangle Park, NC: Instrument Society of America, pp. 59–199, 230–272.

Boyd, S. P. and Barratt, C. H. 1991. *Linear Controller Design: Limits of Performance.* Englewood Cliffs, NJ: Prentice Hall, pp .23–66, 145–194, 311–371.

Ziegler, J. G. and Nichols, N. B. 1942. Optimum settings for automatic controllers. *Transactions of ASME (American Society for Mechanical Engineers).* (64) 759–768.

* cited by examiner

*Primary Examiner*—Ramesh Patel
(74) *Attorney, Agent, or Firm*—Blakely, Sokoloff, Taylor & Zafman LLP

(57) ABSTRACT

An apparatus is provided for controlling a system to achieve a specified response. In one embodiment, the apparatus is a proportional, integrative, and derivative (PID) controller having a proportional element, an integrative element, and a derivative element coupled together. The elements respond to a reference signal and generate a control signal that causes a plant to generate a plant output. The proportional element has a gain element where the gain is a function of the ultimate gain of the plant ($K_u$) and the ultimate period of the plant ($T_u$). The controllers may also be embodied in non-PID controllers that share common elements, such as the use of: (a) Astrom-Hagglund controller output as an input for a subsequent controller; (b) internal feedback; and (c) a subsequent controller that performs a subtraction operation to generate the difference between the output of the Astrom-Hagglund controller and the output of the subsequent controller.

50 Claims, 6 Drawing Sheets

APPARATUS FOR IMPROVED GENERAL-PURPOSE PID AND NON-PID CONTROLLERS

FIELD OF THE INVENTION

The present invention relates to the field of controllers. More particularly, the present invention relates to improved general-purpose proportional-integrative-derivative (PID)) and improved non-PID general-purpose controllers.

BACKGROUND OF THE INVENTION

The purpose of a controller is to force, in a meritorious way, the response of a system (conventionally called the plant) to achieve a specified response (the reference signal).

Controllers are ubiquitous in real world industrial and commercial settings. Controllers are embedded in almost every electronic product and every real-world mechanical and thermodynamic system.

The discovery of efficient controllers is of considerable practical importance because a small percentage improvement in the operation of plants translates into large economic savings.

The cruise control device in an automobile is an example of a controller. The driver may want his automobile to travel at 65 miles per hour (mph). The controller causes fuel to flow into the automobile's engine (the plant) so as to close the gap between the car's current speed (the current plant response) and the desired speed (the reference signal). Since the plant does not respond instantaneously to a new setting of the reference signal by the driver, the speed of the car (the plant response) does not instantaneously become 65 mph. Instead, the controller continuously adjusts the flow of fuel based on the continuously changing difference between the car's actual speed and the reference signal. That is, there is continuous feedback of the plant output to the controller. If the automobile was traveling at less than 65 mph when the reference signal was initially set to 65 mph, the output signal of the controller (the control variable) would be set to initially increase the flow of fuel to the automobile's engine. On the other hand, if the automobile automobile's speed was greater than 65 mph, the output signal of the controller (the control variable) would be set to initially decrease the flow of fuel.

Some controllers are constructed from components that operate in continuous time. For example, controllers can be constructed from mechanical, pneumatic, and electrical components (e.g., inductors, capacitors, resistors, amplifiers). These components operate in continuous time. In addition, many other real-world controllers are constructed from components that operate in discrete time steps such that the overall effect closely (and adequately) approximates the continuous version of the same controller.

Many real-world controllers are manual. However, the focus herein is on automatic controllers—that is, controllers that automatically process information concerning reference signal(s) and plant response(s) (and possibly other information, such as the available internal states of the plant) in order to generate the control signals.

FIG. 1 shows elements of an illustrative closed-loop feedback controller in a system. Referring to FIG. 1, a controller 120 and a plant 140 are contained in the system. The output of the controller is a control variable (signal) 130. The control variable 130 is the input to the plant 140. The plant 140 has one output 150 (referred to herein as the plant response). The controller 120 has two inputs, namely the reference signal 110 and the plant response 150. Controller 120 receives the plant response 150 by use of the feedback signal 160. The system in FIG. 1 is called a "closed loop" system because there is feedback 160 of the plant output 150 back to the controller 120. A feedback loop created by feedback signal 160 is referred to herein as an external feedback because the feedback loop is external to the controller 120. Controllers without such external feedback are called "open loop" controllers. "Open loop" controllers are considerably simpler (and generally less useful in real world applications) than "closed loop" controllers. The actual plant response 150 is typically compared to the externally supplied reference signal 110. This comparison typically entails subtracting these two time-domain signals. When the comparison is done in this way, the controller acts only on the difference between the actual plant response 150 and the reference signal 110. When subtraction is used, the subtractor (not shown here) is sometimes shown outside of controller 120. In any event, regardless of how the comparison between the plant output and the reference signal is performed and regardless of where it is shown, the purpose of a closed-loop controller is to produce, given the reference signal 110 and the feedback signal 160, a value for the control variable 130 that causes the plant response to approach and/or match the reference signal 110 in a meritorious way.

Controller 120 may have more than one distinct output (i.e., control variable). In that event, each such control variable is an input to the plant.

Plant 140 may have more than one distinct output 150. If a plant has k outputs that are to be controlled, then there are k reference signals and each reference signal is paired with a particular plant output that is to be controlled. Each of the k plant outputs that is to be controlled is compared with (e.g., subtracted from) its associated reference signal. The controller uses the results of the k comparisons in determining the output(s) of the controller.

In addition, internal states of a plant are sometimes made available as additional inputs to a controller. Internal states provide additional information to the controller. The number of plant outputs, the number of control variables, and the number of internal states (if any are used at all) are, in general, not equal to each other (although they may, by coincidence, be equal).

Automatic controllers are typically constructed from a variety of signal-processing blocks that process time-domain signals. Each processing block has one or more inputs and a single output. Examples include, but are not limited to, gain (i.e., multiplication of a time-domain signal by a constant), differeutiator (which can be represented with a transfer function of S, where s is the Laplace transform operator), integrator (transfer function of 1/s), adder, subtractor (an adder in which one input is negated), lead (transfer function of the form 1+τs), lag (transfer function of the form 1/(1+τs)), differential input integrators (i.e., integral of the difference between two signals), delay, inverter, absolute value, limiter, multiplier (i.e., multiplication of two signals), divider, and conditional operators (switches).

FIG. 2 is a block diagram of a control system consisting of a plant and a PID controller composed of proportional, integrative, derivative, adder, and subtractor blocks. The output signal of the illustrative controller 500 is control variable 590. The control variable is, in turn, the input to the plant 592. The plant has one output (plant response) 594. The plant response is fed back (externally as signal 596) and becomes one of the controller's two inputs. The controller's other input is the reference signal 508. The fed-back plant response, signal 596, and the externally supplied reference signal 508 are compared (by simple subtraction at subtractor 510). The providing of the plant output as an input to the controller is often referred to as external feedback.

The input to a controller typically consists of reference signal(s) and plant response(s). The input to a controller sometimes also includes internal state variables of the plant. Sometimes, the output(s) of the controller may be made directly available as inputs to the controller. The providing of the controller output as an input to the controller is sometimes referred to as internal feedback. Sometimes, there is a form of internal feedback in which the output other than the controller's final output is provided as an input to the controller. This is another example of internal feedback. In practice, a controller often uses the difference (error) between each reference signal and the corresponding plant response.

The output of a controller consists of control variable(s) that are passed from the controller to the plant.

The individual signal-processing blocks of a controller are coupled to one another in a particular topological arrangement. The topology of a controller entails the specification of the total number of processing blocks to be employed in the controller, the type of each block (e.g., gain, integrator, differentiator, lead, lag, adder, subtractor), the connections (directed lines) between the input point(s) and the output point of each block in the controller, the connections (directed lines) between blocks of the controller and the external input(s) to the controller, and the connections (directed lines) between blocks of the controller and the external output(s) of the controller.

Block diagrams are a useful tool for representing the flow of information in controllers and systems containing controllers. Block diagrams contain signal-processing function blocks, external input and output points, and directed lines carrying signals between the blocks.

Lines in a block diagram herein represent time-domain signals. Lines herein are directional in that they represent the flow of information. A function block within a block diagram for a controller typically has one or more inputs, but only one output. The lines pointing toward a block represent signals coming into the block. The single line pointing away from a block represents the block's single output.

In a block diagram herein, an external input is represented by an external point with a directed line pointing away from that point. Similarly, in the block diagrams herein, an external output point is represented by an external point with a line pointing toward that point.

Adders are conventionally represented by circles in the block diagrams included herein, where each input to an adder is labeled with a positive or negative sign (so adders may be used to perform both addition and subtraction).

In FIG. 2, adder 510 performs the function of subtracting the plant output 596 (which is given a minus sign) from the externally supplied reference signal 508 (which is given a plus sign). This particular arrangement implements negative feedback.

Takeoff points (conventionally represented in block diagrams herein by a large dot) provide a way to disseminate a signal to more than one other function block in a block diagram. Takeoff point 520 in FIG. 2 receives subtractor output 512 and disseminates this signal to function blocks 530, 540, and 550.

In FIG. 2, subtractor output 512 output from subtractor 510 is passed (through 520 and 522) into a gain block 530. A gain block (as shown in FIG. 2 as a triangle) multiplies (amplifies) its input by a specified constant amplification factor (e.g., the numerical constant 214.0). The amplified result 538 becomes the first of the three inputs to addition block 580. This portion of FIG. 2 implements proportional control. The simplest type of controller merely considers the difference (error) between the reference signal and the plant output and produces a control variable (i.e., the input to the plant) that is proportional to the current value of the error. However, for all but the simplest situations, proportional control leads to overshoot, instability, and inefficiency. These deficiencies are addressed by the remaining blocks of FIG. 2.

The subtractor's output 512 is also passed (through 520 and 524) into gain block 540 (with a gain of 1,000.0) and the amplified result 548 is passed into integrator block 560. The integrator is shown in FIG. 2 by a rectangle labeled 1/s, where s is the Laplace transform variable. The result 568 of this integration (with respect to time) becomes the second input to addition block 580. This portion of the Figure implements integral control based on the integral, over time, of the difference between the plant output and reference signal.

The subtractor's output 512 is also passed (through 520 and 526) into gain block 550 (with a gain of 15.5) and the amplified result 558 is passed into differentiator block 570 (shown in the Figure by a rectangle labeled with the Laplace transform variable s) and becomes the third input to addition block 580. This portion of the Figure implements derivative control based on the derivative, over time, of the difference between the plant output and reference signal.

Since the output (i.e., control variable 590) of the controller in FIG. 2 is the sum of a proportional (P) term, an integrative (I) term, and a differentiating (D) term, this type of controller is called a PID controller.

Each of the three parts of a PID controller contributes to its overall performance.

The proportional part of the controller provides direct feedback of the error between the plant output and the externally supplied reference signal.

The integral part of the controller enables the controller to make the plant output agree with the reference signal in the steady state. Even a small positive (negative) error will, when integrated over time, lead to an increasing (decreasing) control signal.

The derivative part of the controller enables the controller to improve closed-loop stability. A proportional controller is almost always late in compensating for an error between the plant output and the reference signal. The derivative part of the controller enables the controller to make a prediction of future error (based on extrapolating the slope of the tangent to the error curve).

The PID controller was patented in 1939 by Albert Callender and Allan Stevenson of Imperial Chemical Limited of Northwich, England. The PID controller was a significant improvement over earlier and simpler control techniques (which often were merely proportional).

There are many different measures of merit that are commonly used for controllers.

For example, it is common to want to minimize the time required to bring about the desired response of the plant. Sometimes, the goal of minimizing the time required to bring about the desired plant response is stated in terms of the rise time or the settling time. The rise time is the time required for the plant output to first reach a specified percentage (e.g., 95%) of the reference signal. The settling time is the first time for which the plant response reaches and stays within a specified percentage (e.g., 2%) of the reference signal. More frequently, control engineers express the goal of minimizing the time required to bring about the desired plant response in terms of minimizing the integral of the time-weighted absolute error. This measure favors the rapid reduction of the discrepancy between the reference signal and the plant response and imposes ever-greater penalties on discrepancies that occur at later times.

Typically, a controller is required to do much more than merely minimize the time-weighted absolute error. The measure of merit of a controller is typically multi-objective in the sense that it involves more than one element. In practice, there is often a conflict among these elements.

For example, in addition to wanting to minimize the time required to bring about the desired plant response, it is also common to simultaneously want to avoid significantly overshooting the desired plant response. In the case where the reference signal is initially greater than the plant response, the overshoot is the percentage by which the plant response exceeds the reference signal after first achieving the reference value. Although it is desirable for the automobile to quickly reach the desired speed, the driver certainly does not want to achieve this goal by providing so much fuel that the car's speed first increases to 120 miles per hour. Such an strategy would undoubtedly reduce the time required to reach 65 mph; however, this strategy would drastically overshoot the reference signal.

Overshoot can be dangerous because the plant can be destroyed (e.g., a boiler exceeds its safe operating temperature).

Moreover, overshoot is typically costly in terms of energy. The cost of the energy required to bring about the desired plant response is often an additional explicit consideration in measuring the merit of a controller.

Real-world controllers must also comply with the reality that the actual value of a control variable must be finite (e.g., cannot be an impulse of infinite amplitude). Thus, it is also common to place certain practical limits on the value of the control variable(s) so that the plant is not presented with extreme values for the control variable(s). This is often accomplished by inserting a limiter between the controller and the plant. The limiter alone introduces significant non-linearity into the overall control process. A plant's internal state variables are often similarly constrained.

All real-world plants, controllers, and their sensors are imperfect. For example, the plant usually does not have the precise characteristics that the control engineer thinks that it has. One reason for this is that the plant's characteristics are not known with either precision or certainty. Another reason is that the plant's characteristics vary at random or drift over time as the plant ages. Thus, it is desirable that a controller operates robustly in the face of variations in the actual characteristics of the plant.

Similarly, in the real world, a plant typically does not accurately receive the control signal that the controller actually produced. It is desirable that a controller operates robustly in the face of disturbances that may be added into the controller's output (i.e., the control variable) prior to reaching the plant. Thus, disturbance rejection is often a requirement of an effective real world controller.

Also, the controller may not receive an accurate reading of the plant's output or the reference signal because of sensor noise. It is desirable that a controller operates robustly in the face of noise in the plant output or reference signal.

A good controller should operate in a consistent manner in the face of variations in the step size of the reference signal.

Stability is another important consideration in measuring the merit of a controller. In fact, it is often an overriding concern. A system whose performance varies radically with small changes in the plant (e.g., a car whose engine response doubled with a small change in temperature) would, at the minimum, be useless and, at worst be dangerous.

PID controllers are in widespread use in industry today. As Astrom and Hagglund (1995, referenced above) noted, "In process control, more than 95% of the control loops are of PID types"

However, even though PD controllers are in widespread use in industry today, the need for better controllers is widely recognized. As Astrom and Hagglund (1995, page 4) further observe, " . . . audits of paper mills in Canada [show] that a typical mill has more than 2,000 control loops and that 97% use PI control. Only 20% of the control loops were found to work well."

As Astrom and Hagglund (1995, page 2) also observe,

"A large cadre of instrument and process engineers are familiar with PD control. There is a well-established practice of installing, tuning, and using the controllers. In spite of this there are substantial potentials for improving PD control."

Boyd and Barratt stated in *Linear Controller Design: Limits of Performance* (Boyd and Barratt 1991) state, "The challenge for controller design is to productively use the enormous computing power available. Many current methods of computer-aided controller design simply automate procedures developed in the 1930's through the 1950's, for example, plotting root loci or Bode plots. Even the 'modern' state-space and frequency-domain methods (which require the solution of algebraic Riccati equations) greatly underutilize available computing power."

Before a PID controller can be used, it is necessary to choose (tune) the numerical parameters for the controller's signal-processing blocks.

For decades, the Ziegler-Nichols tuning rules (Ziegler and Nichols 1942) have been in widespread use for tuning of PD controllers.

In their influential 1995 book *PID Controllers: Theory, Design, and Tuning*, Astrom and Hagglund (1995) identified four families of plants "that are representative for the dynamics of typical industrial processes."

Astrom and Hagglund developed a method in their 1995 book for automatically tuning PID controllers for all the plants in all four of these industrially representative families of plants. Astrom and Hagglund employed the widely used Ziegler-Nichols rules as a "starting point" for their work. The Astrom-Hagglund tuning rules outperform the widely used Ziegler-Nichols rules on all the plants in all four families of plants. As Astrom and Hagglund observe, "[Our] new methods give substantial improvements in control performance while retaining much of the simplicity of the Ziegler-Nichols rules."

The methods developed by Astrom and Hagglund use several parameters representing the overall characteristics of a plant. These parameters are not, of course, a complete representation of the behavior of the plant. However, these parameters offer the practical advantage of being obtainable for real-world plants by means of relatively straightforward testing that may be readily performed in the field.

In one version of their method, Astrom and Hagglund use two frequency-domain parameters, namely the ultimate gain, $K_u$ (the minimum value of the gain that must be introduced into the feedback path to cause the system to oscillate) and the ultimate period, $T_u$ (the period of this lowest frequency oscillation). In another version of their method, Astrom and Hagglund use two time-domain parameters, namely the time constant, $T_r$, and the dead time, L (the period before the plant output begins to respond significantly to a new reference signal). Astrom and Hagglund describe a procedure for estimating these parameters from the plant's response to a step input.

Early PID controllers were built from mechanical, pneumatic, or analog electrical components that implemented the proportional, integrative, and derivative parts of the PID controller. For example, inductors and capacitors can be used to implement differentiation and integration in an analog electrical controller. The component values of these physical components were variable-valued. However, the topology of these controllers was typically not variable. Instead, the topology was the fixed proportional-integrative-derivative topology. However, as Astrom and Hagglund (1995) observe:

"Practically all PID controllers made today are based on microprocessors."

The fact that most present day controllers are electronic devices that are programmed by use of software means that a topology that differs from the conventional PID topology can be readily implemented today merely by changing software.

References Cited

U.S. Patents

Callender, Albert and Stevenson, Allan Brown. 1939. *Automatic Control of Variable Physical Characteristics*. U.S. Pat. No. 2,175,985. Filed Feb. 17, 1936 in United States. Filed Feb. 13, 1935 in Great Britain. Issued Oct. 10, 1939 in United States.

Other Publications

Astrom, Karl J. and Hagglund, Tore. 1995. *PID Controllers: Theory, Design, and Tuning*. Second Edition. Research Triangle Park, NC: Instrument Society of America.
Boyd, S. P. and Barratt, C. H. 1991. *Linear Controller Design: Limits of Performance*. Englewood Cliffs, N.J.: Prentice Hall.
Ziegler, J. G. and Nichols, N. B. 1942. Optimum settings for automatic controllers. *Transactions of ASME (American Society for Mechanical Engineers)*. (64) 759–768.

SUMMARY OF THE INVENTION

Improved general-purpose controllers are described herein. In one embodiment, a PIN controller comprises a proportional element, an integrative element, and a derivative element coupled together and responsive to a reference signal to generate a control signal in response thereto to cause a plant to generate a plant output, wherein the proportional element has a gain element with a gain being substantially equal to $$0.72 * K_u * e^{-\frac{1.6}{K_u} + \frac{1.2}{K_u^2}} - .001234000198 * T_u - 6.117274273 * 10^{-6}$$

where $K_u$ is the ultimate gain of the plant and $T_u$ is the ultimate period of the plant.

A number of non-PID controllers are described as well.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Improved general-purpose PID and non-PID controllers are described herein. In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

In their influential 1995 book *PID Controllers: Theory, Design, and Tuning*, Astrom and Hagglund (1995) identified four families of plants "that are representative for the dynamics of typical industrial processes."

The first of the four families of plants in Astrom and Hagglund 1995 consists of plants represented by transfer functions of the form $$G(s) = \frac{e^{-s}}{(1+sT)^2} \tag{A}$$

where T=0.1, . . . , 10.

The second family consists of the n-lag plants represented by transfer functions of the form $$G(s) = \frac{1}{(1+s)^n} \quad (B)$$

where n=3, 4, and 8.

The third family consists of plants represented by transfer functions of the form $$G(s) = \frac{1}{(1+s)(1+\alpha s)(1+\alpha^2 s)(1+\alpha^3 s)} \quad (C)$$

where α=0.2, 0.5, and 0.7.

The fourth family consists of plants represented by transfer functions of the form $$G(s) = \frac{1 - \alpha s}{(s+1)^3} \quad (D)$$

where α=0.1, 0.2, 0.5, 1.0, and 2.0.

Figure 1:
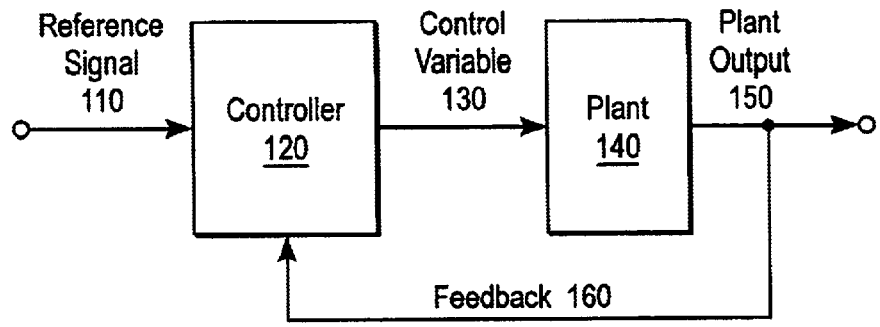
FIG. 1 shows the major elements of an illustrative control system containing a controller and a plant.
Figure 2:
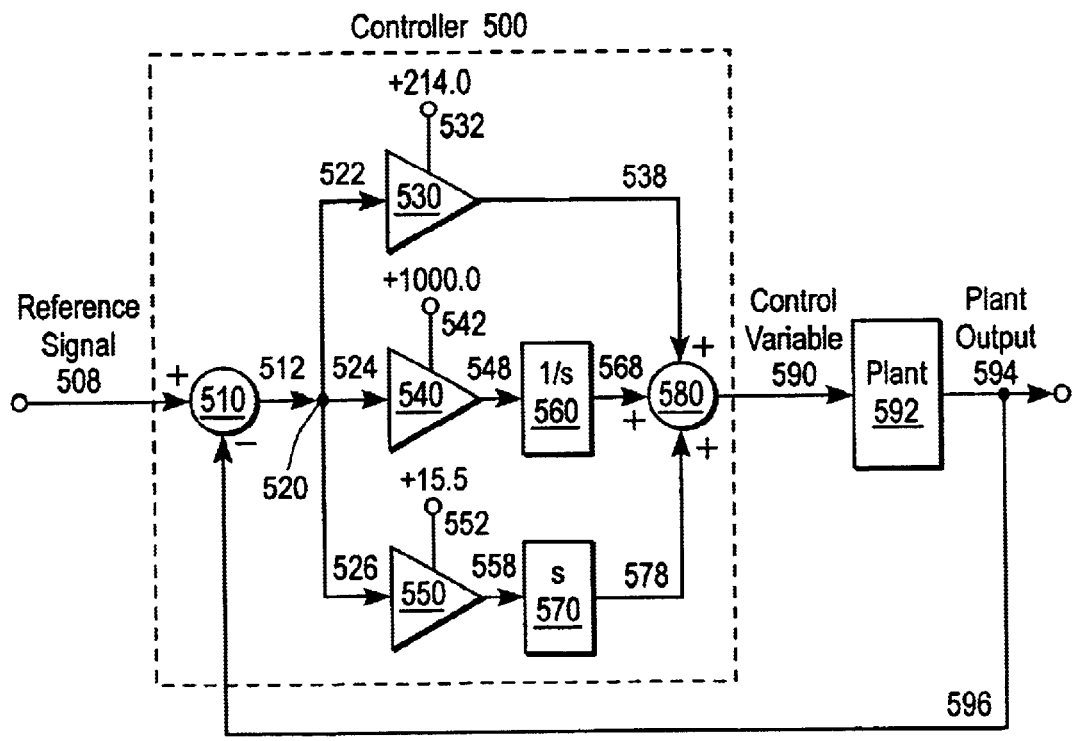
FIG. 2 shows a block diagram of a control system consisting of a plant and a PID controller.
Figure 3:
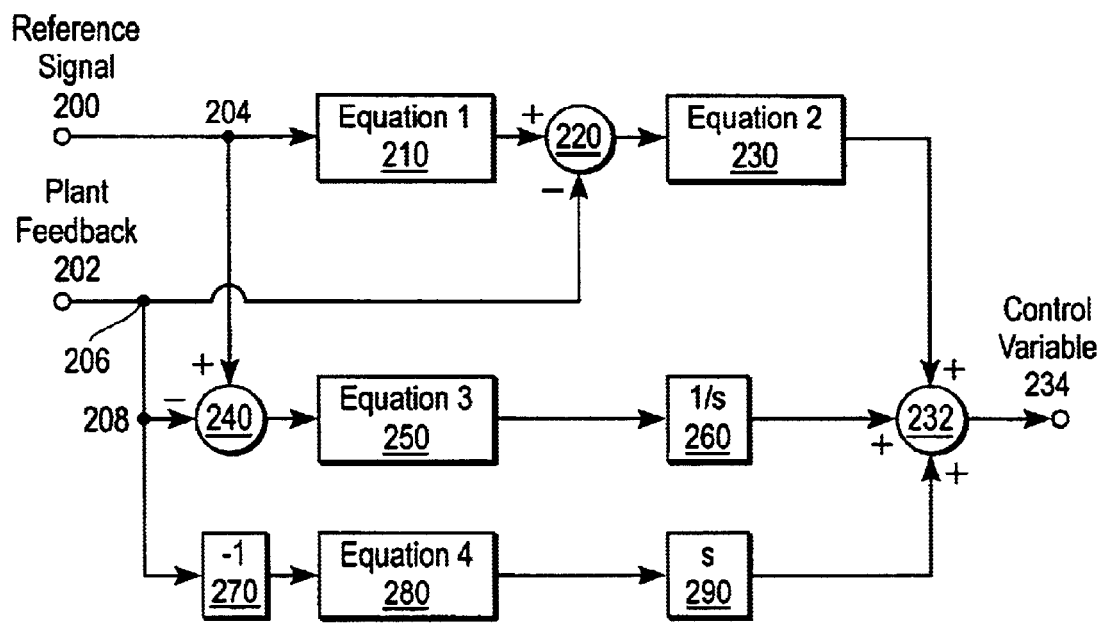
FIG. 3 shows a PID controller with setpoint weighting of the reference signal.

FIG. 3 shows a PID controller with setpoint weighting of the reference signal. The topology of the controller in FIG. 3 is the topology of the PID controller devised by Astrom and Hagglund in their 1995 book (and is also the topology of an improved PID controller described herein). The topology for a PD controller in FIG. 3 differs from that of FIG. 2 in that FIG. 3 has the additional feature of setpoint weighting of the reference signal.

The inputs to the controller of FIG. 3 are the reference signal 200 and the plant output 202 (feedback) while the output of this controller is the control variable 234. The block 260 with 1/s represents integration and the block 290 with s represents differentiation. Each of blocks 210, 230, 250 and 280 in FIG. 3 that is labeled with an equation that represents a gain block that is parameterized by the value of the equation. Block 270 with -1 is a gain block with a gain of -1. Adder 232 is shown with positive signs on all its inputs represents an adder. Subtractors 220 and 240 as shown with a positive sign on one input and a negative sign on the second input represents a subtractor. The block 210 (whose gain is specified below by "Equation 1") implements setpoint weighting for the input to the proportional (P) block 230 (whose gain is specified below by "Equation 2"). That is, the reference signal 200 (setpoint) is weighted by a constant specified by the gain block 210 and Equation 1 below before the plant output 202 (feedback) is subtracted. Note that there is no setpoint weighting for the input to the gain block 250 (whose gain is specified below by "Equation 3") associated with the integrative (I) block.

In some PID controllers, there is the additional feature of setpoint weighting of the reference signal for the derivative (D) block. However, in the PID controller devised by Astrom and Hagglund in their 1995 book, the constant used for the setpoint weighting of the reference signal 200 for the derivative (D) block is zero. Thus, the input to the gain block 280 (whose gain is specified below by "Equation 4") associated with the derivative (D) block 290 is merely the negated plant output 202. This fact is manifested in FIG. 3 by the presence of a gain block 270 with a gain of -1.

The tuning rules (above) devised by Astrom and Hagglund in their 1995 book are given by four equations.

Equation 1 in FIG. 3 for the PID controller devised by Astrom and Hagglund in their 1995 book implements setpoint weighting, b, for the input to the proportional (P) block and is $$b = 0.25 * e^{\frac{0.56}{K_u} + \frac{-0.12}{K_u^2}}$$

Equation 2 in FIG. 3 is the gain, $K_p$, of the proportional (P) block and is $$K_p = 0.72 * K_u * e^{\frac{-1.6}{K_u} + \frac{1.2}{K_u^2}}$$

Equation 3 in FIG. 3 is the gain, $K_i$, for the integrative (I) block for and is $$K_i = \frac{0.72 * K_u * e^{\frac{-1.6}{K_u} + \frac{1.2}{K_u^2}}}{0.59 * T_u * e^{\frac{-1.3}{K_u} + \frac{0.38}{K_u^2}}}$$

Equation 4 in FIG. 3 is the gain, $K_d$, for the derivative (D) block for and is $$K_d = 0.108 * K_u * T_u * e^{\frac{-1.6}{K_u} + \frac{1.2}{K_u^2}} * e^{\frac{-1.4}{K_u} + \frac{0.56}{K_u^2}}$$

The tuning rules devised by Astrom and Hagglund in their 1995 book for the PD controller of FIG. 3 outperform the widely used Ziegler-Nichols tuning rules on the 16 industrially representative plants used by Astrom and Hagglund.

Table 1 shows the characteristics of 33 different plants that are employed in evaluating the improved PD controller described herein and each of the three improved non-PD controllers described herein. All of these plants are members of Astrom and Hagglund's four families of plants. Column 1 identifies the plant family (A, B, C, or D). Column 2 shows the particular parameter value of the plant within its family. For example, family B is the family of n-lag plants. The first entry in the table for family B is the plant for which n=3 (i.e., the three-lag plant). Column 3, 4, 5, and 6 of the table describe the plants in terms of each plant's ultimate gain, $K_u$; ultimate period, $T_u$; dead time, L; and the time constant, $T_r$; respectively. Column 7 identifies the 16 plants that are in the test bed used by Astrom and Hagglund in their 1995 book. The PID and three non-PID controllers described herein are evaluated in terms of various combinations of plants from this table. Column 8 indicates which plants are employed in evaluating a PID controller (indicated by "P") described herein and which plants are employed in evaluating the three non-PID controllers described herein (indicated by "1," "2," or "3"). There are 18 plants marked "1," 24 marked with "2," and 24 marked with "3."

TABLE 1

Characteristics of 33 plants

| Family | Parameter value | $K_o$ | $T_u$ | L | $T_r$ | Plants used in Astrom and Hagglund | Plants used for evaluation |
|---|---|---|---|---|---|---|---|
| A | T = 0.1 | 1.07 | 2.37 | 1.00 | 0.10 | X | P, 1, 2, 3 |
| A | T = 0.3 | 1.40 | 3.07 | 1.01 | 0.29 | X | P, 1, 2, 3 |
| A | T = 1 | 2.74 | 4.85 | 1.00 | 1.00 | X | P, 1, 2, 3 |
| A | T = 3 | 6.80 | 7.87 | 1.02 | 2.99 | X | P, 1, 2, 3 |
| A | T = 4.5 | 9.67 | 9.60 | 1.00 | 4.50 |   | P |

TABLE 1-continued

Characteristics of 33 plants

| Family | Parameter value | $K_o$ | $T_u$ | L | $T_r$ | Plants used in Astrom and Hagglund | Plants used for evaluation |
|---|---|---|---|---|---|---|---|
| A | T = 6 | 12.7 | 11.1 | 1.00 | 6.00 | | P, 2, 3 |
| A | T = 7.5 | 15.6 | 12.3 | 1.00 | 7.50 | | P |
| A | T = 9 | 18.7 | 13.4 | 1.01 | 9.00 | | P |
| A | T = 10 | 20.8 | 14.2 | 0.92 | 10.1 | X | P, 1, 2, 3 |
| B | n = 3 | 8.08 | 3.62 | 0.52 | 1.24 | X | P, 1, 2, 3 |
| B | n = 4 | 4.04 | 6.27 | 1.13 | 1.44 | X | P, 1, 2, 3 |
| B | n = 5 | 2.95 | 8.62 | 1.79 | 1.61 | | P, 2, 3 |
| B | n = 6 | 2.39 | 10.9 | 2.45 | 1.78 | | P, 1, 2, 3 |
| B | n = 7 | 2.09 | 13.0 | 3.17 | 1.92 | | P, 2, 3 |
| B | n = 8 | 1.89 | 15.2 | 3.88 | 2.06 | X | P, 1, 2, 3 |
| B | n = 11 | 1.57 | 21.6 | 6.19 | 2.41 | | 1 |
| C | α = 0.1 | 113 | 0.198 | −0.244 | 0.674 | | 1 |
| C | α = 0.2 | 30.8 | 0.56 | −0.14 | 0.69 | X | P, 1, 2, 3 |
| C | α = 0.215 | 26.6 | 0.63 | −0.16 | 0.71 | | P |
| C | α = 0.23 | 23.6 | 0.69 | −0.12 | 0.71 | | P |
| C | α = 0.26 | 19.0 | 0.83 | −0.10 | 0.72 | | P |
| C | α = 0.3 | 15.0 | 1.04 | −0.02 | 0.72 | | P, 2, 3 |
| C | α = 0.4 | 9.62 | 1.59 | 0.11 | 0.76 | | P, 2, 3 |
| C | α = 0.5 | 6.85 | 2.23 | 0.27 | 0.80 | X | P, 1, 2, 3 |
| C | α = 0.6 | 5.41 | 2.92 | 0.43 | 0.87 | | P, 2, 3 |
| C | α = 0.7 | 4.68 | 3.67 | 0.60 | 0.96 | X | P, 1, 2, 3 |
| C | α = 0.9 | 4.18 | 5.31 | 3.44 | 0.685 | | 1 |
| D | α = 0.1 | 6.21 | 4.06 | 0.64 | 1.22 | X | P, 1, 2, 3 |
| D | α = 0.2 | 5.03 | 4.44 | 0.74 | 1.23 | X | P, 1, 2, 3 |
| D | α = 0.5 | 3.23 | 5.35 | 1.15 | 1.17 | X | P, 1, 2, 3 |
| D | α = 0.7 | 2.59 | 5.81 | 1.38 | 1.16 | | P, 2, 3 |
| D | α = 1 | 2.02 | 6.3 | 1.85 | 1.07 | X | P, 1, 2, 3 |
| D | α = 2 | 1.15 | 7.46 | 3.46 | 0.765 | X | P, 1, 2, 3 |

Table 2 shows the characteristics of 18 additional plants that are used to further evaluate the performance of the controllers described herein. All of these additional plants are members of Astrom and Hagglund's families A, C, and D. Columns 3, 4, 5, and 6 of the table describe the plants in terms of each plant's ultimate gain, $K_u$; ultimate period, $T_u$; dead time, L; and the time constant, $T_r$; respectively. There are no additional plants within family B in this table because the plant parameter for this family must be an integer, and all of the integer values within the range of values used by Astrom and Hagglund are already covered by the plants in Table 1.

TABLE 2

Characteristics of 18 additional plants

| Family | Parameter value | $K_o$ | $T_u$ | L | $T_r$ |
|---|---|---|---|---|---|
| A | 0.15 | 1.134152 | 2.573214 | 0.993183 | 0.153733 |
| A | 0.5 | 1.740201 | 3.651538 | 0.982342 | 0.509153 |
| A | 0.9 | 2.513191 | 4.597013 | 1.011091 | 0.894777 |
| A | 2.5 | 5.691241 | 7.252302 | 0.999461 | 2.500589 |
| A | 4.0 | 8.682941 | 9.067256 | 1.002152 | 3.99924 |
| A | 9.0 | 18.69671 | 13.44237 | 1.005105 | 8.996778 |
| C | 0.25 | 20.2764 | 0.786096 | −0.0998 | 0.713911 |
| C | 0.34 | 12.04297 | 1.245879 | 0.005431 | 0.744685 |
| C | 0.43 | 8.345211 | 1.77205 | 0.144091 | 0.775107 |
| C | 0.52 | 6.403112 | 2.357631 | 0.287422 | 0.821741 |
| C | 0.61 | 5.301533 | 2.995545 | 0.439193 | 0.884892 |
| C | 0.69 | 4.715286 | 3.601437 | 0.563387 | 0.965559 |
| D | 0.15 | 5.523179 | 4.260649 | 0.680462 | 1.234716 |
| D | 0.3 | 4.207509 | 4.769533 | 0.846353 | 1.226771 |
| D | 0.6 | 2.858337 | 5.539566 | 1.236692 | 1.181601 |
| D | 0.85 | 2.254037 | 6.032202 | 1.616708 | 1.116592 |

TABLE 2-continued

Characteristics of 18 additional plants

| Family | Parameter value | $K_o$ | $T_u$ | L | $T_r$ |
|---|---|---|---|---|---|
| D | 1.2 | 1.740722 | 6.568647 | 2.158801 | 1.020546 |
| D | 1.8 | 1.250292 | 7.252302 | 3.15099 | 0.82445 |

The Astrom-Hagglund controller has the following performance for the 16 plants used by Astrom and Hagglund in their 1995 book:

0.2172262 average ITAE for setpoint
0.2312103 average ITAE for disturbance rejection
0.03457885 average reciprocal of minimum attenuation
1.814599 average maximum sensitivity "ITAE" is the integral of the time-weighted absolute error. This measure is commonly used in evaluating controllers. In this evaluation of performance, the controller is exposed to a reference signal for a certain amount of time. Then, at a later time, a disturbance signal starts to be added. The term "ITAE for setpoint" refers to the value of ITAE up to the time the disturbance signal starts. Once the disturbance signal starts, the clock used for the time-weighting in ITAE is reset to zero and a new ITAE value is computed for the time period that includes the disturbance signal. This new computation of ITAE is referred to as the "ITAE for disturbance".

The Astrom-Hagglund controller has the following performance for the 18 plants of table 2:

0.2100210 average ITAE for setpoint
0.2102676 average ITAE for disturbance rejection
0.03300830 average reciprocal of minimum attenuation
1.803764 average maximum sensitivity The Astrom-Hagglund controller has the following performance for the 20 plants of table 1 marked with a "1" in column 8 of table 1:

0.2122177 average ITAE for setpoint
0.2246510 average ITAE for disturbance rejection
0.03118940 average reciprocal of minimum attenuation
1.794630 average maximum sensitivity The Astrom-Hagglund controller has the following performance for the 24 plants of table 1 marked with a "2" in column 8 of table 1:

0.2077904 average ITAE for setpoint
0.2114775 average ITAE for disturbance rejection
0.03052635 average reciprocal of minimum attenuation
1.798578 average maximum sensitivity The Astrom-Hagglund controller has the following performance for the 30 plants of table 1 marked with a "3" in column 8 of table 1:

0.1970922 average ITAE for setpoint
0.1764673 average ITAE for disturbance rejection
0.03093210 average reciprocal of minimum attenuation
1.754127 average maximum sensitivity A Novel PID Controller The topology of the controller in FIG. 3 is the common topology of the Astrom-Hagglund PID controller and the improved PD controller described herein. One difference between the Astrom-Hagglund controller and the improved PID controller described herein are in the values of b, $K_p$, $K_i$, and $K_d$. That is, this difference is in the "tuning."

The values of b, $K_p$, $K_i$, and $K_d$ for the improved PID controller are obtained by adding the following quantities to values of b, $K_p$, $K_i$, and $K_d$ devised by Astrom and Hagglund in their 1995 book:

$$K_{p-adj} = -.001234000198 * T_u - 6.117274273 * 10^{-6}$$

$$K_{i-adj} = -.06852522843250242 * \frac{K_u}{T_u}$$

$$K_{d-adj} = -0.002664037864(e^{T_u})^{log(1.634220701^{logK_u})}$$

$$b_{adj} = \frac{K_u}{e^{K_u}}$$

In other words, the values of b, $K_p$, $K_i$, and $K_d$ for the improved PID controller described herein are as follows:

$$K_{p-ref} = 0.72 * K_u * e^{\frac{-1.6}{K_u} + \frac{1.2}{K_u^2}} - .001234000198 * T_u -$$

$$6.117274273 * 10^{-6}$$

$$K_{i-ref} = \frac{0.72 * K_u * e^{\frac{-1.6}{K_u} + \frac{1.2}{K_u^2}}}{0.59 * T_u * e^{\frac{-1.3}{K_u} + \frac{0.38}{K_u^2}}} - .06852522843250242 * \frac{K_u}{T_u}$$

$$K_{d-ref} = 0.108 * K_u * T_u * e^{\frac{-1.6}{K_u} + \frac{1.2}{K_u^2}} * e^{\frac{-1.4}{K_u} + \frac{0.56}{K_u^2}} -$$

$$0.002664037864(e^{T_u})^{log(1.634220701^{logK_u})}$$

$$b_{ref} = 0.25 * e^{\frac{0.56}{K_u} + \frac{-0.12}{K_u^2}} + \frac{K_u}{e^{K_u}}$$

The improved PID controller has the following performance for the 16 plants used by Astrom and Hagglund in their 1995 book (i.e., the 16 plants marked with a "A" in column 7 of table 1):

0.1980355 average ITAE for setpoint 0.2268145 average ITAE for disturbance rejection 0.03093210 average reciprocal of minimum attenuation 1.791002 average maximum sensitivity The improved PID controller has the following performance for the 18 plants of table 2:

0.1884844 average ITAE for setpoint 0.2009776 average ITAE for disturbance rejection 0.03284905 average reciprocal of minimum attenuation 1.777227 average maximum sensitivity The improved PID controller has the following performance for the 30 plants marked with a "3" in column 8 of table 1:

0.1805829 average ITAE for setpoint 0.1697852 average ITAE for disturbance rejection 0.03078645 average reciprocal of minimum attenuation 1.730238 average maximum sensitivity Averaged over the 16 plants used by Astrom and Hagglund in their 1995 book (i.e., the 16 plants marked with a "A" in column 7 of table 1), the improved PID controller has 90.5% of the setpoint ITAE of the Astrom-Hagglund controller, 96% of the ITAE for disturbance rejection of the Astrom-Hagglund controller, 99.3% of the reciprocal of minimum attenuation of the Astrom-Hagglund controller, and 98.5% of the maximum sensitivity, $M_s$, of the Astrom-Hagglund controller.

Averaged over the 18 plants of table 2, the improved PID controller has 89.7% of the setpoint ITAE of the Astrom-Hagglund controller, 95.6% of the ITAE for disturbance rejection of the Astrom-Hagglund controller, 99.5% of the reciprocal of minimum attenuation of the Astrom-Hagglund controller, and 98.5% of the maximum sensitivity, $M_s$, of the Astrom-Hagglund controller.

Averaged over the 30 plants marked with a "3" in column 8 of table 1, the improved PID controller has 91.6% of the setpoint ITAE of the Astrom-Hagglund controller, 96.2% of the RTAE for disturbance rejection of the Astrom-Hagglund controller, 99.5% of the reciprocal of minimum attenuation of the Astrom-Hagglund controller, and 98.6% of the maximum sensitivity, $M_s$, of the Astrom-Hagglund controller.

Thus, the improved PID controller (and, as will be seen below, three non-PID controllers described herein) is an improvement over the PID controller devised by Astrom and Hagglund in their 1995 book. As previously mentioned, the tuning rules devised by Astrom and Hagglund for their PD controller outperform the widely used Ziegler-Nichols tuning rules on the 16 industrially representative plants used by Astrom and Hagglund.

As previously mentioned, the discovery of efficient controllers is of considerable practical importance because a small percentage improvement in the operation of plants translates into large economic savings.

The improved PID controller described above creates a control variable (output of the controller) that depends on the following six inputs:

the time constant, $T_r$, of the plant, ultimate gain, $K_u$, of the plant, ultimate period, $T_u$, of the plant, dead time, L, of the plant, the plant output, and the reference signal to the controller.

The first four of the above items are constant values and are characteristics of the particular plant that is to be controlled by the controller.

The last two of the above times are typically time-domain signals.

Although the PID controller specified above sets forth specific gains with respect to the proportional element, the integrative element and the derivative element as well as a specific weighting with the respect to the reference signal, a PD controller with one or more of these specific gains (but not including all) is still advantageous to use. For example, a PID controller in which the proportional gain element as specified above yet does not have an integrative element and a derivative element with the gains as specified above nor the weighting of the reference signal as specified is advantageous to use in certain situations. Similarly, a PID controller with an integrative element having the gain as specified above operating in conjunction with one or more of the proportional elements and the derivative element applying different gains and/or a reference signal with a different weighting is also advantageous to use in certain situations. The same is true for PID controllers applying the same gain as the derivative element specified above and/or the weighting of the reference signal specified above, yet with different gains for the proportional gain element and/or the integrative element.

Similarly, as transfer functions are indicative of topologies, it is possible to create controllers that will produce the same output as a PID controller with the same transfer function specified above, yet use a different topology. It is well within the skill in the art to modify such a transfer function to produce a PID controller with the same output as the PID controller specified above. Thus, the PID of the present invention as set forth herein is not limited to PID controller with the transfer function set forth above and extends to a PID controller that generates an output that is the same or substantially similar to the PID controller given above.

Three Non-PID Controllers

A First Non-PID Controller Embodiment

Figure 4:
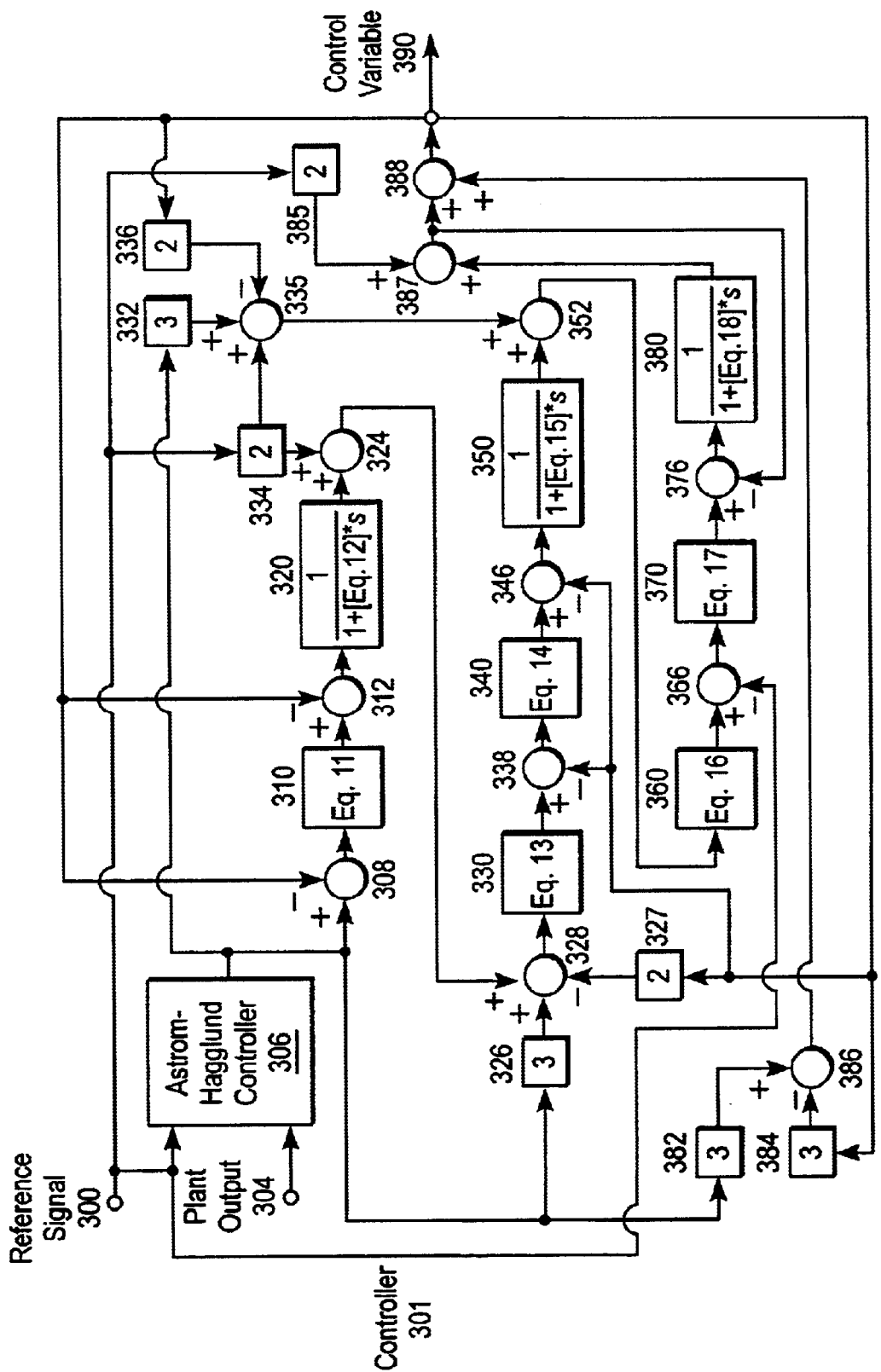
FIG. 4 is a block diagram of one embodiment of a non-PID controller.

FIG. 4 is a block diagram of one embodiment of a non-PID controller. Referring to FIG. 4, non-PID controller 301 is composed of the following types of signal processing blocks:

gain (i.e., multiplication of a time-domain signal by a constant), differentiator (transfer function of s), integrator (transfer function of 1/s), adder, subtractor, and lag (transfer function of the form $1/(1+\tau s)$).

The output of non-PD controller 301 is control variable 390.

There are three inputs to non-PID controller 301, namely the reference signal 300, the plant output 304, and control variable 390 (i.e., internal feedback of the output of non-PID controller 301 into itself).

Note the plant output enters non-PID controller 301 through a PD controller 306 that is tuned with the tuning rules devised by Astrom and Hagglund in their 1995 book. That is, Astrom-Hagglund controller 306 is the PID controller of FIG. 2 that is tuned according to the equations presented earlier based on the ultimate gain, $K_u$, and the ultimate period, $T_u$, of the plant.

In one embodiment, non-PID controller 301 has eight gain blocks (326, 327, 332, 334, 336, 382, 384, and 385) that are parameterized by a constant numerical amplification factor. In particular, gain blocks 326, 332, 382, and 384 each have a gain of 3. Gain blocks 327, 334, 336, and 385 each have a gain of 2.

In addition, in one embodiment, non-PID controller 301 has five gain blocks (310, 330, 340, 360, and 370) that are parameterized by equations as follows.

Gain block 310 in FIG. 4 is parameterized by equation 11:

$$10^{e^{\log|\log|\log(eK_u * L)/L\|}}$$

Gain block 330 in FIG. 4 is parameterized by equation 13:

$$10^{e^{\log|\log|K_u * L\|}}$$

Gain block 340 in FIG. 4 is parameterized by equation 14:

$$e^{\log|K_u/L|}$$

Gain block 360 in FIG. 4 is parameterized by equation 16:

$$10^{e^{\log|\log|K_u * L\|}}$$

Gain block 370 in FIG. 4 is parameterized by equation 17:

$$e^{\log(K_u)}$$

In one embodiment, non-PD controller 301 also has three lag blocks 320, 350, and 380 (i.e., blocks with transfer function of the form $1/(1+\tau s)$) that are given as follows.

Lag block 320 in FIG. 4 is parameterized by equation 12:

$$T_r$$

Lag block 350 in FIG. 4 is parameterized by equation 15:

$$T_r$$

Lag block 380 in FIG. 4 is parameterized by equation 18:

$$T_r$$

In one embodiment, non-PID controller 301 has internal feedback in several places. For one thing, its own output (control variable 390) is fed back to seven other blocks (308, 312, 327, 336, 338, 346, and 384) within this controller. In addition, there is internal feedback involving subtractor 376, lag block 380, and adder 387.

In one embodiment, non-PD controller 301 has 12 adders and subtractors. In particular, it has four two-argument adders (324, 352, 388, and 387), seven two-argument subtractors (308, 312, 338, 346, 366, 376, and 386), and two three-argument subtractors (328 and 335) in which one signal is subtracted from the sum of the two other signals.

The output 390 (control variable) of non-PID controller 301 is the sum of two signals as described below.

The two signals that are added together by adder 388 are described in detail below. Focusing on the bottom portion of FIG. 4, the first of two signals that are added together (by adder 388) to create the output 390 of non-PID controller 301 is the result of subtracting with subtractor 386 the result of applying gain of 3, via gain block 384, to the controller output 390 from the result of applying gain of 3, via gain block 382, to the output of the Astrom-Hagglund controller 306. Focusing on the top portion of FIG. 4, "the second of the two signals" that are added together (by adder 388) to create the output 390 of non-PID controller 301 is the sum 387 of the result of applying gain of 2, via gain block 385, to the reference signal 300 and the result of applying lag, via lag block 380, parameterized (equation 18) by $$T_r$$

to a incoming signal (the output of subtractor 376). This incoming signal (the output of subtractor 376) is described in detail below and is the result of subtracting "the second of the two signals" as defined above (that is, "the second of the two signals" is participating in an internal feedback loop within non-PID controller 301) from the result of applying gain, via gain block 370, (equation 17) of $$e^{\log(K_u)}$$

to the result of subtracting via subtractor 366 the reference signal 300 from the result of applying gain, via gain block 360, (equation 16) of $$10^{e^{\log|\log|K_u * L\|}}$$

to the sum of two earlier signals generated using adder 352.

The two earlier signals that are added together by adder 352 are described in detail below. The first of the two earlier signals is the result of a three-way subtraction performed using subtractor 335 in which the result of applying gain of 2, via gain block 336, to the controller output 390 is subtracted from the sum of the result of applying gain of 3, via gain block 332, to the output of the Astrom-Hagglund controller 306 and the result of applying gain of 2, via gain block 334, to the reference signal 300.

The second of these two earlier signals is the result of applying lag, via lag block 350, (equation 15) parameterized by $T_r$ to the result of subtracting by subtractor 346 the controller output 390 from the result of applying gain, via gain block 340, (equation 14) of $$e^{log|log|K_u/L|}$$

to the result of subtracting by subtractor 338 the controller output 390 from the result of applying gain, via gain block 330, (equation 13) of $$10^{e^{log|log|K*L|}}$$

to the result of three-way subtraction via subtractor 328 in which the result of applying a gain of 2, via gain block 327, to the controller output 390 is subtracted from the sum of the result of applying a gain of 3, via gain block 326, to the output of the Astrom-Hagglund controller 306 and the sum from adder 324 of two intermediate signals.

The two intermediate signals that are added together by adder 324 are described in detail below. The first of these two intermediate signals is the result of applying a gain of 2 via gain block 334 to the reference signal 300. The second of these two intermediate signals is the result of applying lag by lag block 320 (equation 12) parameterized by $T_r$ to the result of subtracting, via subtractor 312, the controller output 390 from the result of gain, via gain block 310, (equation 11) parameterized by $$10^{e^{log|log|log(eK_uL)/L|}}$$

to the result of subtracting via subtractor 308, the controller output 390 from the output of the Astrom-Hagglund controller 306.

Non-PID controller 301 can also be described in terms of its transfer function.

The transfer function for non-PID controller 301 is given by the equation: U=

$$\frac{A(3 + 3L^2 E_{13}E_{14}E_{16}E_{17} + L^3 E_{11}E_{13}E_{14}E_{16}E_{17} + 3L(1 + E_{16}E_{17})) + (2 + 2L^2 E_{13}E_{14}E_{16}E_{17} + L(-1 + 2E_{16})E_{17})R}{4 + L^3(1 + E_{11})E_{13}E_{14}E_{16}E_{17} + L^2(1 + E_{14} + 2E_{13}E_{14})E_{16}E_{17} + 2L(2 + E_{16}E_{17})}$$

where U is the controller output, A is the output of the Astrom-Hagglund controller, R is the reference signal, $E_{11}$ through $E_{17}$ correspond to equations 11 through 17, respectively, and L is the transfer function for the lag blocks used in the controller. That is, $$L = \frac{1}{1 + T_r * s}$$

The transfer function for the Astrom-Hagglund PID controller is given by the equation:

$$A = K_p(b*R - P) + \frac{K_i}{s}(R - P) + K_d * s * (-P)$$

where A is the output of the Astrom-Hagglund controller, R is the reference signal, P is the plant output, and b, $K_p$, $K_i$, and $K_d$ are given by the equations above.

Non-PID controller 301 has the following performance for the 18 plants of table 2:

0.1347030 average ITAE for setpoint
0.1785071 average ITAE for disturbance rejection
0.03161919 average reciprocal of minimum attenuation
1.685891 average maximum sensitivity Non-PID controller 301 has the following performance for the 20 plants marked with a "1" in column 8 of table 1:

0.1408500 average ITAE for setpoint
0.1924412 average ITAE for disturbance rejection
0.02951210 average reciprocal of minimum attenuation
1.667144 average maximum sensitivity Averaged over the 18 plants of table 2, non-PID controller 301 has 64.1% of the setpoint ITAE of the Astrom-Hagglund controller, 84.9% of the ITAE for disturbance rejection of the Astrom-Hagglund controller, 95.8% of the reciprocal of minimum attenuation of the Astrom-Hagglund controller, and 93.5% of the maximum sensitivity, $M_s$, of the Astrom-Hagglund controller.

Averaged over the 20 plants marked with a "1" in column 8 of table 1, non-PID controller 301 has 66.4% of the setpoint ITAE of the Astrom-Hagglund controller, 85.7% of the ITAE for disturbance rejection of the Astrom-Hagglund controller, 94.6% of the reciprocal of minimum attenuation of the Astrom-Hagglund controller, and 92.9% of the maximum sensitivity, $M_S$, of the Astrom-Hagglund controller.

Thus, non-PID controller 301 is an improvement over the PID controller devised by Astrom and Hagglund in their 1995 book.

Figure 7:
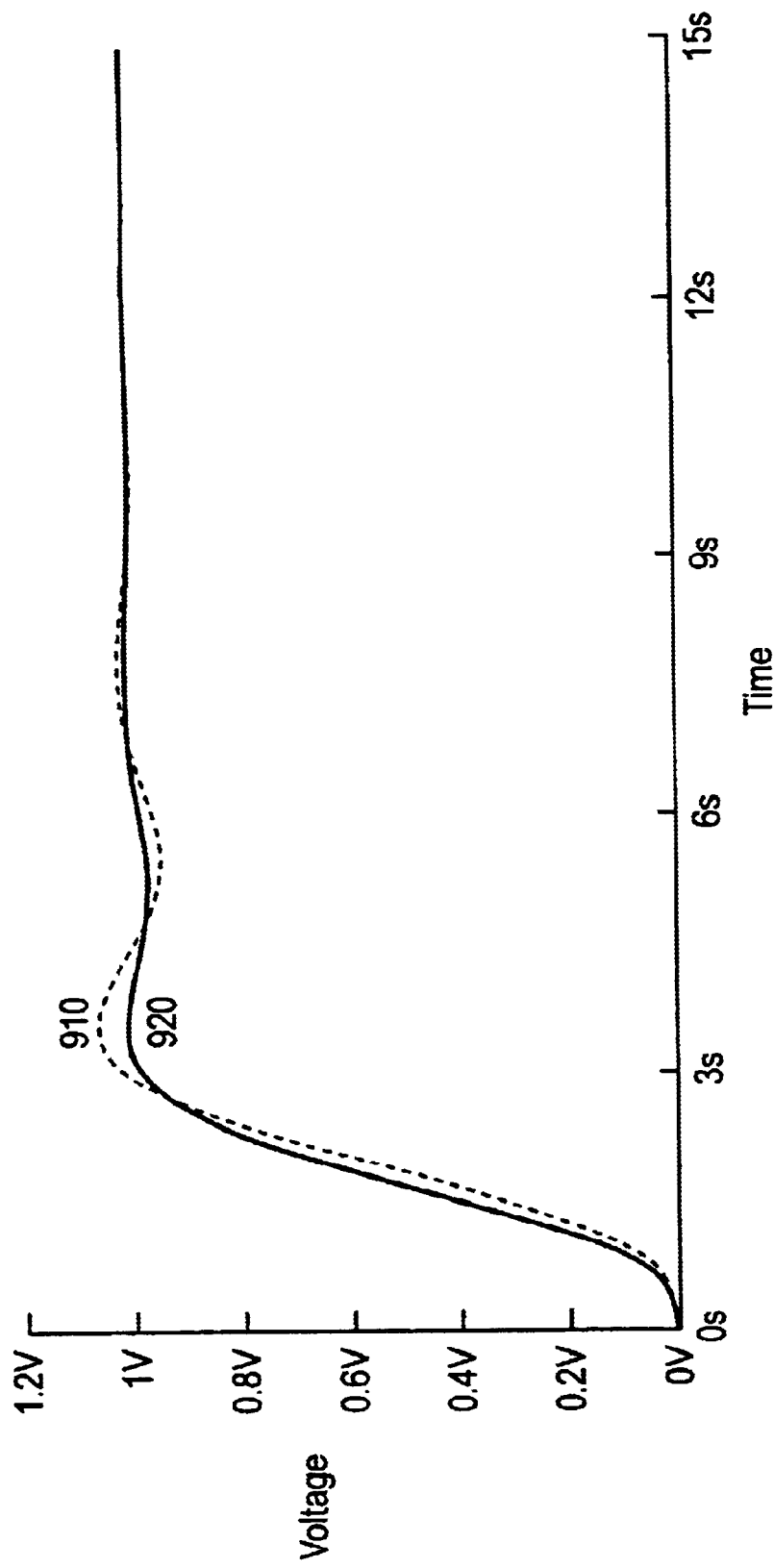
FIG. 7 compares the time-domain response of the first non-PD controller of the present invention and the Astrom and Hagglund controller for a particular illustrative plant.

FIG. 7 compares the time-domain response of non-PID controller 301 (solid line labeled 920) and the Astrom and Hagglund controller (dotted line labeled 910) for the three-lag plant (a particular one of the plants used by Astrom and Hagglund in their 1995 book) to a reference signal that steps up from 0 volts to 1 volt. As is shown, the response of the Astrom and Hagglund controller is slower than non-PID controller 301; overshoots the target value of 1 to a greater degree than non-PID controller 301; and takes longer to settle than non-PID controller 301. Similar results are obtained for the other 15 plants in the family of plants specified by Astrom and Hagglund and for additional plants not specified by Astrom and Hagglund.

A Second Non-PID Controller Embodiment

Figure 5:
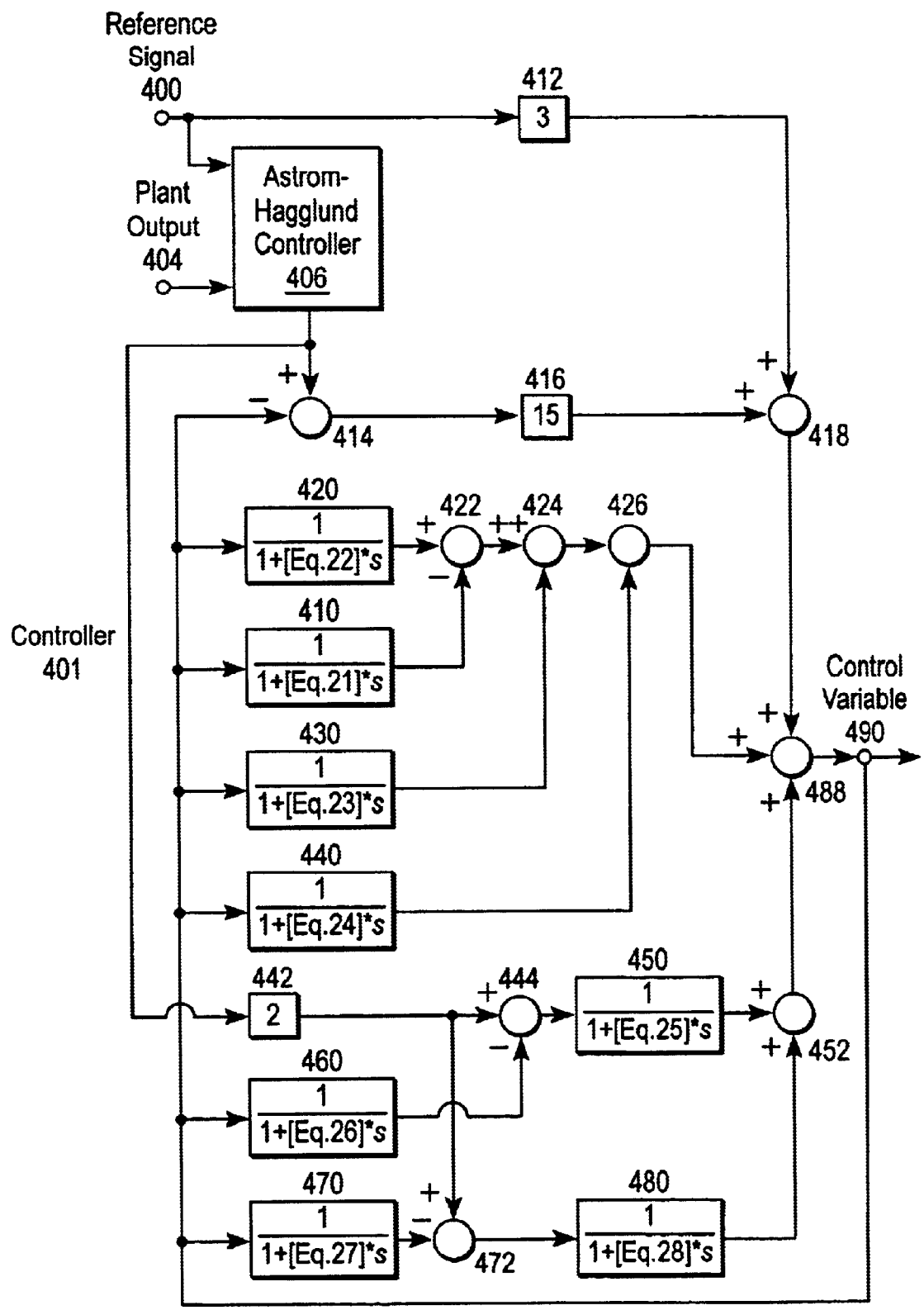
FIG. 5 is a block diagram of another embodiment of a non-PID controller.

FIG. 5 is a block diagram of one embodiment of another non-PID controller, non-PID controller 401. Referring to FIG. 5, non-PID controller 401 is composed of the following types of signal processing blocks:

gain (i.e., multiplication of a time-domain signal by a constant), differentiator (transfer function of s), integrator (transfer function of 1/s), adder, subtractor, and lag (transfer function of the form 1/(1+τs)).

The output of non-PID controller 401 is control variable 490.

There are three inputs to non-PID controller 401, namely the reference signal 400, the plant output 404, and control variable 490 (i.e., internal feedback of the output of non-PID controller 401 into itself).

Note the plant output enters non-PID controller 401 through a PID controller 406 that is tuned with the tuning rules devised by Astrom and Hagglund in their 1995 book. That is, Astrom-Hagglund controller 406 is the PID controller of FIG. 2 that is tuned according to the equations presented above based on the ultimate period, $T_u$, and the ultimate gain, $K_u$, of the particular plant.

In one embodiment, non-PID controller 401 has three gain blocks (412, 416, and 442) that are parameterized by a constant numerical amplification factor. In particular, gain block 412 has a gain of 3. Gain block 416 has a gain of 15. Gain block 442 has a gain of 2.

In one embodiment, non-PID controller 401 also has eight lag blocks 410, 420, 430, 440, 450, 460, 470, and 480 (i.e., blocks with transfer function of the form $1/(1+\tau s)$) as follows.

Lag block 410 in FIG. 5 is parameterized by equation 21:

$$\log|2T_r + K_u^L|$$

Lag block 420 in FIG. 5 is parameterized by equation 22:

$$abs\left(\log\left(abs\left(T_r + K_u \wedge K_u \wedge \left(\frac{\frac{1}{\frac{0.68631}{0.13031} \cdot T_r^L - T_u}}{K_u \wedge \frac{\log|\log|T_r + K_u(K_u^L)||}{T_r + K_u \wedge T_r + K_u^L}} \cdot (K_u^L)^L - T_u}\right)\right)\right)\right)$$

Lag block 430 in FIG. 5 is parameterized by equation 23:

$$\log|2T_r + K_u^{\log|T_r + K_u L|}|$$

Lag block 440 in FIG. 5 is parameterized by equation 24:

$$|\log|T_r + K_u^L|$$

Lag block 450 in FIG. 5 is parameterized by equation 25:

$$|\log|T_r + \log(T_r + 1.2784)||$$

Lag block 460 in FIG. 5 is parameterized by equation 26:

$$\log|T_r + (T_r + (x)^{\log|\log|K_u \cdot L||})^L|$$

where $$x = T_r + K_u^{\log|\log|T_r + K_u L|}$$

Lag block 470 in FIG. 5 is parameterized by equation 27:

$$\log|T_r + (T_r + K_u^L)^L|$$

Lag block 480 in FIG. 5 is parameterized by equation 28:

$$\log|2T_r + K_u^L|$$

In one embodiment, non-PID controller 401 has internal feedback of its own output (control variable 490) back into itself. Specifically, control variable 490 is input to six lag blocks (410, 420, 430, 440, 460, and 470). In addition, control variable 490 is subtracted, via subtractor 414, from the output of the PID) controller 406 devised by Astrom and Hagglund in their 1995 book and the difference becomes the input to gain block 416.

In one embodiment, non-PID controller 401 also has one three-argument adder 488, two two-argument adders (418 and 452), and six two-argument subtractors (414, 422, 424, 426, 444, and 472).

The output 490 (control variable) of non-PID controller 401 is the sum 488 of three signals. The three signals that are added together by adder 488 described in detail below. The first of these three signals that are added together (by adder 488) to create the output 490 of non-PID controller 401 is the sum 418 the result of applying gain of 3, via gain block 412, to the reference signal 400 and the result of applying gain of 15, via gain block 415, to the result of subtracting the controller output 490 from the output of the Astrom-Hagglund controller 406. The second of the three signals that are added together (by adder 488) to create the output 490 of non-PID controller 401 is the result of subtracting three decrementing signals from the result of applying lag 420, via gain block 420, parameterized (equation 22) by $$abs\left(\log\left(abs\left(T_r + K_u \wedge K_u \wedge \left(\frac{\frac{1}{\frac{0.68631}{0.13031} \cdot T_r^L - T_u}}{K_u \wedge \frac{\log|\log|T_r + K_u(K_u^L)||}{T_r + K_u \wedge T_r + K_u^L}} \cdot (K_u^L)^L - T_u}\right)\right)\right)\right)$$

to the controller output 490.

The three decrementing signals are described in detail below.

The first of the three decrementing signals is the result of applying lag, via lag block 410, parameterized (equation 21) by $$\log|2T_r + K_u^L|$$

to the controller output 490.

The second of the three decrementing signals is the result of applying lag, via lag block 430, parameterized (equation 23) by $$\log|2T_r + K_u^{\log|T_r + K_u L|}|$$

to the controller output 490.

The third of the three decrementing signals is the result of applying lag, via lag block 440, parameterized (equation 24) by $$\log|T_r + K_u^L|$$

to the controller output 490.

The third of the three signals that are added together (by adder 488) to create the output 490 of non-PID controller 401 is the sum, via adder 452, of two intermediate signals. The two intermediate signals that are that are added together by adder 452 are described in detail below. The first of these intermediate signals that are added together by adder 452 is the result of applying lag, via lag block 450, (equation 25) parameterized by $$|\log|T_r + \log(T_r + 1.2784)||$$

to the result of subtracting using subtractor 444 the result of applying a lag, via lag block 460, (equation 26) parameterized by $$\log|T_r + (T_r + (x)^{\log|\log|K_u \cdot L||})^L|$$

where $$x = T_r + K_u^{\log|\log|T_r + K_u L|}$$

to the controller output 490 from the result of applying gain of 2, via ame block 442, to the output of the Astrom-Hagglund controller 406.

The second of these intermediate signals that are added together by adder 452 is the result of applying lag, via lag block 480, (equation 28) parameterized by $$\log|2T_r + K_u{}^L|$$

to the result of subtracting using subtractor 472 the result of applying lag, via lag block 470, (equation 27) parameterized by $$\log|T_r + (T_r + K_u{}^L)^L|$$

to the controller output 490 from the result of applying gain of 2, via gain block 442, to the output of the Astrom-Hagglund controller 406.

Non-PID controller 401 can also be described in terms of its transfer function.

The transfer function for non-PID controller 401 is given by the equation: U=

$$\frac{-3R + A(-15 - 2/(1 + E_{25}*s) - 2/(1 + E_{28}*s))}{16 + \frac{1}{1+E_{21}*s} - \frac{1}{1+E_{22}*s} + \frac{1}{1+E_{23}*s} + \frac{1}{1+E_{24}*s} + \frac{1}{(1+E_{25}*s)(1+E_{26}*s)} + \frac{1}{(1+E_{27}*s)(1+E_{28}*s)}}$$

where U is the controller output, A is the output of the Astrom-Hagglund controller, R is the reference signal, and $E_{21}$ through $E_{28}$ correspond to equations 21 through 28, respectively.

Non-PID controller 401 has the following performance for the 18 plants of table 2:

0.1763263 average ITAE for setpoint 0.1904819 average ITAE for disturbance rejection 0.03264539 average reciprocal of minimum attenuation 1.757822 average maximum sensitivity Non-PID controller 401 has the following performance for the 24 plants marked with a "2" in column 8 of table 1:

0.1777198 average ITAE for setpoint 0.1941363 average ITAE for disturbance rejection 0.03018042 average reciprocal of minimum attenuation 1.752849 average maximum sensitivity Averaged over the 18 plants of table 2, non-PID controller 401 has 84% of the setpoint ITAE of the Astrom-Hagglund controller, 90.6% of the ITAE for disturbance rejection of the Astrom-Hagglund controller, 98.9% of the reciprocal of minimum attenuation of the Astrom-Hagglund controller, and 97.5% of the maximum sensitivity, $M_s$, of the Astrom-Hagglund controller.

Averaged over the 24 plants marked with a "2" in column 8 of table 1, non-PID controller 401 has 85.5% of the setpoint ITAE of the Astrom-Hagglund controller, 91.8% of the ITAE for disturbance rejection of the Astrom-Hagglund controller, 98.9% of the reciprocal of minimum attenuation of the Astrom-Hagglund controller, and 97.5% of the maximum sensitivity, $M_s$, of the Astrom-Hagglund controller.

Thus, non-PID controller 401 is an improvement over the PID controller devised by Astrom and Hagglund in their 1995 book.

A Third Non-PID Controller Embodiment

Figure 6:
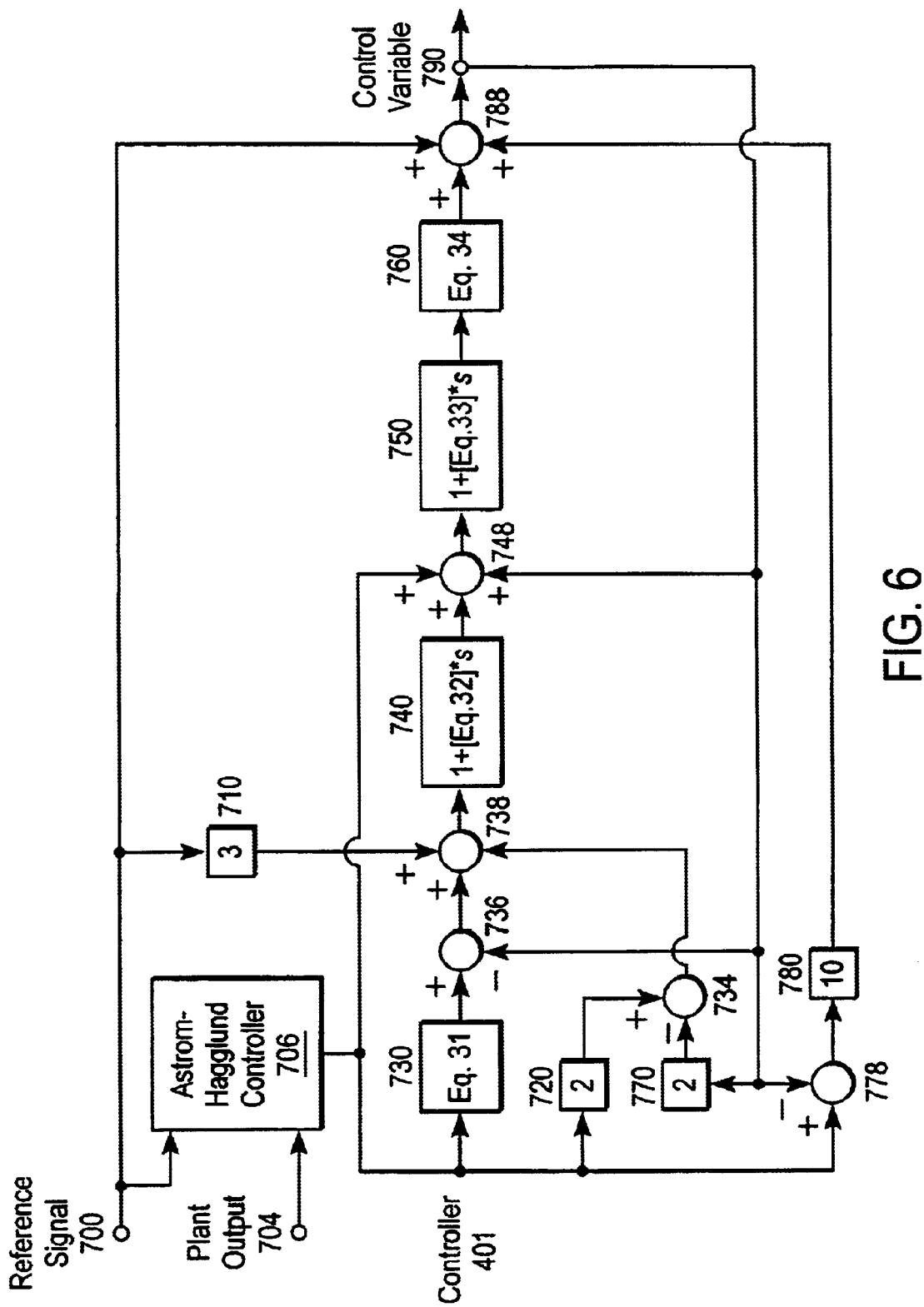
FIG. 6 is a block diagram of yet another embodiment of a non-PID controller.

FIG. 6 is a block diagram of still another embodiment of a non-PID controller. Referring to FIG. 6, non-PID controller 701 is composed of the following types of signal processing blocks:

gain (i.e., multiplication of a time-domain signal by a constant), differentiator (transfer function of s), integrator (transfer function of 1/s), adder, subtractor, and lead (transfer function of the form 1+τs).

The output of non-PID controller 701 is control variable 790.

In one embodiment, there are three inputs to non-PID) controller 701, namely the reference signal 700, the plant output 704, and control variable 790 (i.e., internal feedback of the output of non-PID controller 701 into itself).

Note the plant output enters non-PID controller 701 through a PID controller 706 that is tuned with the tuning rules devised by Astrom and Hagglund in their 1995 book. That is, Astrom-Hagglund controller 706 is the PID controller of FIG. 2 that is tuned according to the equations presented earlier based on the ultimate period, $T_u$, and ultimate gain, $K_u$, of the particular plant.

In one embodiment, non-PID controller 701 has four gain blocks (710, 720, 770, and 780) that are parameterized with constant numerical amplification factor. In particular, gain block 710 has a gain of 3. Each of gain blocks 720 and 770 have a gain of 2. Gain block 780 has again of 10.

In one embodiment, non-PID controller 701 also has two gain blocks (730 and 760) whose gain is expressed as an equation involving the four free variables that describe a particular plant, namely the plant's time constant, $T_r$, ultimate period, $T_u$, ultimate gain, $K_u$, dead time, L. Specifically, the gain block 730 has a gain (equation 31) of $$\left|\log\left|T_r - T_u + \log\left|\frac{\log(|L|^L)}{T_u + 1}\right|\right|\right|$$

while gain block 760 has a gain (equation 34) of $$\|\log|T_r+1|\|$$

Non-PID controller 701 also has two lead blocks 740 and 750 (i.e., blocks with transfer functions of the form 1+τs).

Lead block 740 in FIG. 6 is parameterized by equation 32:

$$NLM(\log|L| - (abs(L)^L)^2 T_u{}^3 (T_u+1) T_r e^L - 2T_u e^L)$$

where NLM is the following non-linear mapping from its argument x to the final parameter of the lead block:

$$NLM(x) = 10^0 \text{ if } x < -100 \text{ or } x > 100$$
$$10^{-\frac{100}{19} - \frac{1}{19}x} \text{ if } -100 \le x < -5$$
$$10^{\frac{100}{19} - \frac{1}{19}x} \text{ if } 5 < x \le 100$$
$$10^x \text{ if } -5 \le x \le 5$$

Lead block 750 in FIG. 6 is parameterized by equation 33:

$$NLM(\log|L| - 2T_u e^L (2 + K_u(\log|K_u e^L| - \log|L|)T_u + K_u e^L))$$

In one embodiment, non-PID controller 701 has internal feedback of its own output (control variable 790) back into itself. Specifically, control variable 790 is subtracted from the output of the PID controller 706 devised by Astrom and Hagglund in their 1995 book. The difference (amplified by a factor of 10 by gain block 780) becomes one of the three signals that are added together (by adder 788) to create control variable 790. Similarly, control variable 790 (amplified by a factor of 2 by gain block 770) is subtracted from the output of the Astrom-Hagglund controller 706 (amplified by a factor of 2 by gain block 720) by subtractor 734.

In one embodiment, non-PID controller 701 also has three three-argument adders (738, 748, and 788) and three two-argument subtractors (734, 736, and 778).

The output 790 (control variable) of non-PID controller 701 is the sum from adder 788 of three signals.

The three signals that are added together by adder 788 to produce the controller's output 790 (control variable) are described in detail below.

The first of the three signals that are added together (by adder 788) to create the output 790 of non-PID controller 701 is the reference signal 700 to the controller.

The second of the three signals that are added together (by adder 788) to create the output 790 of non-PID controller 701 is the result of applying gain of 10, via gain block 780, to the result 778 of subtracting the controller output 790 from the output of the Astrom-Hagglund controller 706. That is, this controller has internal feedback in which its own output, output 790, is fed back into the controller itself. In particular, output 790 is fed back (negatively) into subtractor 778. The output of subtractor 778 is the result of subtracting the controller output 790 from the output of the Astrom-Hagglund controller 706. This difference is then multiplied by a factor of 10 by gain block 780. The result of this multiplication becomes one of the three signals that are added together (by adder 788) to create the output 790 of non-PID controller 701.

The third of the three signals that are added together (by adder 788) to create the output 790 of non-PID controller 701 is the result of applying a gain, via gain block 760, (equation 34) of $$\|\log|T_r+1|\|$$

to the result of applying a lead using lead block 750 (equation 33) parameterized by $$NLM(\log|L|-2T_u e^L(2K_u(\log|K_u e^L|-\log|L|)T_u+K_u e^L))$$

to the sum of three intermediate signals (summed together using adder 748).

The three intermediate signals that are added together by adder 748 are described in detail below. The first of these intermediate signals is the output of the Astrom-Hagglund controller 706. The second of these intermediate signals is the controller output 790. The third of the intermediate signals is the result of applying a lead using lead block 740 (equation 32) parameterized by $$NLM(\log|L|-(abs(L)^L)^2 T_u^{\;3}(T_u+1)T_r e^{L}-2T_u e^L)$$

to the sum of three earlier signals (summed using adder 738).

The three earlier signals that are added together by adder 738 are described in detail below. The first of these earlier signals is the result of applying a gain of 3, via gain block 710, to the reference signal 700. The second of these earlier signals is the result of subtracting, using subtractor 736, the controller output 790 from the result of applying a gain, via gain block 730, parameterized (equation 31) by $$\left\| \log \left| T_r - T_u + \log \left| \frac{\log(|L|^L)}{T_u+1} \right| \right| \right\|$$

to the output of the Astrom-Hagglund controller 706. The third of these earlier signals is the result of subtracting the result of applying a gain of 2, via gain block 770, to the controller output 790 from the result of applying a gain of 2, via gain block 720, to the output of the Astrom-Hagglund controller 706.

In one embodiment, non-PID controller 701 can also be described in terms of its transfer function given below.

$$U = \frac{R(1 + 3E_{34}(1 + E_{32}*s)(1 + E_{33}*s)) + A(10 + E_{34}(3 + E_{31} + 2E_{32}*s + E_{31}E_{32}*s)(1 + E_{33}*s))}{11 + E_{34}(2 + 3E_{32}*s)(1 + E_{33}*s)}$$

where R is the reference signal, A is the output of the Astrom-Hagglund controller, U is the controller output, P is the plant output (which is not used explicitly), $E_{31}$, $E_{32}$, $E_{33}$, and $E_{34}$, refer to equations 31, 32, 33, and 34 respectively.

Non-PID controller 701 has the following performance for the 18 plants of table 2:

0.1717871 average ITAE for setpoint 0.1981528 average ITAE for disturbance rejection 0.03290757 average reciprocal of minimum attenuation 1.668334 average maximum sensitivity Non-PID controller 701 has the following performance for the 24 plants marked with a "3" in column 8 of table 1:

0.1698771 average ITAE for setpoint 0.1984384 average ITAE for disturbance rejection 0.03017291 average reciprocal of minimum attenuation 1.679423 average maximum sensitivity Averaged over the 18 plants of table 2, non-PID controller 701 has 81.8% of the setpoint ITAE of the Astrom-Hagglund controller, 94.2% of the ITAE for disturbance rejection of the Astrom-Hagglund controller, 99.7% of the reciprocal of minimum attenuation of the Astrom-Hagglund controller, and 92.5% of the maximum sensitivity, $M_s$, of the Astrom-Hagglund controller.

Averaged over the 24 plants marked with a "3" in column 8 of table 1, non-PID controller 701 has 81.8% of the setpoint ITAE of the Astrom-Hagglund controller, 93.8% of the ITAE for disturbance rejection of the Astrom-Hagglund controller, 98.8% of the reciprocal of minimum attenuation of the Astrom-Hagglund controller, and 93.4% of the maximum sensitivity, $M_s$, of the Astrom-Hagglund controller.

Thus, non-PID controller 701 is an improvement over the PID controller devised by Astrom and Hagglund in their 1995 book.

The three improved non-PID controllers described above create a control variable (output of the controller) that depend on the following six inputs:

the time constant, $T_r$, of the plant, ultimate gain, $K_u$, of the plant, ultimate period, $T_u$, of the plant, dead time, L, of the plant, the plant output, and the reference signal to the controller.

The first four of the above items are constant values and are characteristics of the particular plant that is to be controlled by the controller.

The last two of the above times are typically time-domain signals.

In addition, the three non-PID improved controllers of the present invention create a control variable (output of the controller) that depends on the above six inputs as well as the following additional input:

the controller output (i.e., the control variable).

There are numerous non-PID controllers with different structure that produce the controller output (i.e., control variable) given the above seven inputs.

There are a number of common elements to the three non-PID controllers set forth above. First, each of the non-PID controllers includes an Astrom-Hagglund controller that generates its output and another controller that operates in response to the output from the Astrom-Hagglund controller, where this second, or subsequent, controller includes at least one in lag element or at least one lead element. Another common element to the three non-PID controllers set forth above is that this subsequent controller utilizes internal feedback to take a control variable that is generated as an output by the controller and feed it back to one of its inputs. Yet another common element between the three non-PID controllers set forth above is that the subsequent controller performs a subtraction operation to generate a difference between the output of the Astrom-Hagglund controller and output of the subsequent controller. All of these elements as specified above are common to all three and individually provide advantages by themselves over other controllers in the prior art.

One of the three non-PID controller includes an internal feedback loop that provides a signal to the controller that is not the final output of the controller itself (i.e., provides internal feedback from one point inside the controller).

Software Implementation

The improved PID controller and the three non-PID improved controllers can be implemented by physical devices or by computer programs.

With respect to software, some portions of the detailed descriptions given above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage medial; optical storage media; flash memory devices; electrical, optical, acoustical or other form propagated signals (e.g., carrier waves, infrared signals, digital signal, etc.); etc.

Whereas many alterations and modifications of the present invention will no doubt become apparent to a person of ordinary skill in the art after having read the foregoing description, it is be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A proportional, integrative, and derivative (PID) controller comprising a proportional element, an integrative element, and a derivative element coupled together and responsive to a reference signal to generate a control signal in response thereto to cause a plant to generate a plant output, wherein the proportional element has a gain element with a gain being substantially equal to $$0.72 * K_u * e^{-\frac{1.6}{K_u} + \frac{1.2}{K_u^2}} - .001234000198 * T_u - 6.117274273 * 10^{-6}$$

where $K_u$ is the ultimate gain of the plant and $T_u$ is the ultimate period of the plant.

2. The PID controller defined in claim 1 wherein gain on the integrative element is substantially equal to $$\frac{0.72*K_u*e^{\frac{-1.6}{K_u}+\frac{1.2}{K_u^2}}}{0.59*T_u*e^{\frac{-1.3}{K_u}+\frac{0.38}{K_u^2}}} - .06852522843250242*\frac{K_u}{T_u}.$$

3. The PID controller defined in claim 1 or 2 wherein gain on the derivative element is substantially equal to $$0.108*K_u*T_u*e^{\frac{-1.6}{K_u}+\frac{1.2}{K_u^2}}*e^{\frac{-1.4}{K_u}+\frac{0.56}{K_u^2}} - 0.002664037864(e^{T_u})^{\log(1.634220701^{\log K_u})}.$$

4. The PID controller defined in claims 1 or 2 wherein the reference signal is weighted by a weight substantially equal to $$0.25*e^{\frac{0.56}{K_u}+\frac{-0.12}{K_u^2}} + \frac{K_u}{e^{K_u}}$$

before the plant output is subtracted therefrom and prior to being fed into the gain element associated with the proportional element.

5. A proportional, integrative, and derivative (PID) controller comprising a proportional element, an integrative element, and a derivative element coupled together and responsive to a reference signal to generate a control signal in response thereto to cause a plant to generate a plant output, wherein gain on the integrative element is substantially equal to $$\frac{0.72*K_u*e^{\frac{-1.6}{K_u}+\frac{1.2}{K_u^2}}}{0.59*T_u*e^{\frac{-1.3}{K_u}+\frac{0.38}{K_u^2}}} - .06852522843250242*\frac{K_u}{T_u},$$

where $K_u$ is the ultimate gain of the plant and $T_u$ is the ultimate period of the plant.

6. The PID controller defined in claim 5 wherein gain on the derivative element is substantially equal to $$0.108*K_u*T_u*e^{\frac{-1.6}{K_u}+\frac{1.2}{K_u^2}}*e^{\frac{-1.4}{K_u}+\frac{0.56}{K_u^2}} - 0.002664037864(e^{T_u})^{\log(1.634220701^{\log K_u})}.$$

7. The PID controller defined in claims 5 or 6 wherein the reference signal is weighted by a weight substantially equal to $$0.25*e^{\frac{0.56}{K_u}+\frac{-0.12}{K_u^2}} + \frac{K_u}{e^{K_u}}$$

before the plant output is subtracted therefrom and prior to being fed into the gain element associated with the proportional element.

8. A proportional, integrative, and derivative (PID) controller comprising a proportional element, an integrative element, and a derivative element coupled together and responsive to a reference signal to generate a control signal in response thereto to cause a plant to generate a plant output, wherein the proportional element has a gain element with a gain being substantially equal to $$0.72*K_u*e^{-\frac{1.6}{K_u}+\frac{1.2}{K_u^2}} - .001234000198*T_u - 6.117274273*10^{-6}$$

where $K_u$ is the ultimate gain of the plant and $T_u$ is the ultimate period of the plant, and further wherein gain on the integrative element is substantially equal to $$\frac{0.72*K_u*e^{\frac{-1.6}{K_u}+\frac{1.2}{K_u^2}}}{0.59*T_u*e^{\frac{-1.3}{K_u}+\frac{0.38}{K_u^2}}} - .06852522843250242*\frac{K_u}{T_u},$$

gain on the derivative element is substantially equal to $$0.108*K_u*T_u*e^{\frac{-1.6}{K_u}+\frac{1.2}{K_u^2}}*e^{\frac{-1.4}{K_u}+\frac{0.56}{K_u^2}} - 0.002664037864(e^{T_u})^{\log(1.634220701^{\log K_u})},$$

and the reference signal is weighted by a weight substantially equal to $$0.25*e^{\frac{0.56}{K_u}+\frac{-0.12}{K_u^2}} + \frac{K_u}{e^{K_u}}$$

before the plant output is subtracted therefrom and prior to being fed into the gain element associated with the proportional element.

9. A proportional, integrative, and derivative (PID) controller comprising a proportional element, an integrative element, and a derivative element coupled together and responsive to a reference signal to generate a control signal in response thereto to cause a plant to generate a plant output, the control signal being substantially the same to that produced by the controller having a proportional element, an integrative element, and a derivative element coupled together and responsive to a reference signal to generate a control signal in response thereto to cause a plant to generate a plant output, wherein the proportional element has a gain element with a gain being substantially equal to $$0.72*K_u*e^{-\frac{1.6}{K_u}+\frac{1.2}{K_u^2}} - .001234000198*T_u - 6.117274273*10^{-6}$$

where $K_u$ is the ultimate gain of the plant and $T_u$ is the ultimate period of the plant, and further wherein gain on the integrative element is substantially equal to $$\frac{0.72*K_u*e^{\frac{-1.6}{K_u}+\frac{1.2}{K_u^2}}}{0.59*T_u*e^{\frac{-1.3}{K_u}+\frac{0.38}{K_u^2}}} - .06852522843250242*\frac{K_u}{T_u},$$

gain on the derivative element is substantially equal to $$0.108*K_u*T_u*e^{\frac{-1.6}{K_u}+\frac{1.2}{K_u^2}}*e^{\frac{-1.4}{K_u}+\frac{0.56}{K_u^2}} - 0.002664037864(e^{T_u})^{\log(1.634220701^{\log K_u})},$$

and the reference signal is weighted by a weight substantially equal to $$0.25*e^{\frac{0.56}{K_u}+\frac{-0.12}{K_u^2}} + \frac{K_u}{e^{K_u}}$$

before the plant output is subtracted therefrom and prior to being fed into the gain element associated with the proportional element.

10. A control apparatus comprising:
   an Astrom-Hagglund (A-H) controller operable to generate an A-H output;
   a subsequent controller operable in response to the A-H output to generate a control variable to control operation of a plant, wherein the subsequent controller comprises at least one lag element responsive to the A-H output.

11. The control apparatus defined in claim 10 wherein the subsequent controller comprises at least one input and is operable to generate a control variable that is used as feedback to the input, such that the subsequent controller has internal feedback.

12. The control apparatus defined in claim 10 wherein the subsequent controller comprises at least one input and has an internal feedback loop that provides a signal to the at least one input, the signal being other than an output of the subsequent controller.

13. The control apparatus defined in claim 10 wherein the subsequent controller comprises a subtractor to generate a difference between the A-H output and an output of the subsequent controller.

14. The control apparatus defined in claim 10 wherein the subsequent controller has a transfer function defined as follows:

$$U = \frac{\begin{array}{c}A(3+3L^2E_{13}E_{14}E_{16}E_{17}+L^3E_{11}E_{13}E_{14}E_{16}E_{17}+3L(1+\\E_{16}E_{17}))+(2+2L^2E_{13}E_{14}E_{16}E_{17}+L(-1+2E_{16})E_{17})R\end{array}}{\begin{array}{c}4+L^3(1+E_{11})E_{13}E_{14}E_{16}E_{17}+L^2(1+E_{14}+\\2E_{13}E_{14})E_{16}E_{17}+2L(2+E_{16}E_{17})\end{array}}$$

where U is a controller output, A is a Astrom-Hagglund controller output, R is a reference signal, and L is a transfer function for the lag blocks used in the controller:

$$L = \frac{1}{1+T_r*s}$$

and where:

$$E_{11}=10^{e^{log|log(eK_u*L)/L|}}$$

$$E_{13}=10^{e^{log|log|K_u*L|}}$$

$$E_{14}=e^{log|K_u/L|}$$

$$E_{16}=10^{e^{log|log|K_u*L|}}$$

and $$E_{17}=e^{log(K_u)}$$

15. The control apparatus defined in claim 10 wherein the subsequent controller has a transfer function defined as follows:

$$U = -\frac{-3R+A(-15-2/(1+E_{25}*s)-2/(1+E_{28}*s))}{16+\frac{1}{1+E_{21}*s}-\frac{1}{1+E_{22}*s}+\frac{1}{1+E_{23}*s}+\frac{1}{1+E_{24}*s}+\frac{1}{(1+E_{25}*s)*(1+E_{26}*s)}+\frac{1}{(1+E_{27}*s)*(1+E_{28}*s)}}$$

where U is an output of the subsequent controller, A is the output of the Astrom-Hagglund controller, R is a reference signal, and where:

$$E_{21}=\log|2T_r+K_u^L|$$

$$E_{22}=\text{abs}\left(\log\left(\text{abs}\left(T_r+K_u^{\wedge K_u^{\wedge}\left(\frac{\frac{0.68631}{0.13031}\cdot T_r^L\cdot T_u}{\frac{T_u}{K_u^{\wedge}\log|\log|T_r+K_u(K_u^L)||}\cdot (K_u^L)^L\cdot T_u}}{\frac{1}{T_r+K_u^{\wedge}\frac{0.69897}{T_r+K_u^L}}\cdot T_r^L-T_u}\right)}\right)\right)$$

$$E_{23}=\log|2T_r+K_u^{log|T_r+K_uL|}|$$

$$E_{24}=\log|T_r+K_u^L|$$

$$E_{25}=|\log|T_r+\log(T_r+1.2784)||$$

$$E_{26}=\log|T_r+(T_r+(x)^{log|log|K_u^{\cdot L|}|})L|$$

where $$x=T_r+K_u^{log|log|T_r+K_uL|}$$

$$E_{27}=\log|T_r+(T_r+K_u^L)^L|$$

and $$E_{28}=\log|2T_r+K_u^L|$$

16. The control apparatus defined in claim 10 wherein the subsequent controller has a transfer function defined as follows:

$$U = \frac{\begin{array}{c}R(1+3E_{34}(1+E_{32}*s)(1+E_{33}*s))+\\A(10+E_{34}(3+E_{31}+2E_{32}*s+E_{31}E_{32}*s)(1+E_{33}*s))\end{array}}{11+E_{34}(2+3E_{32}*s)(1+E_{33}*s)}$$

where U is the output of the subsequent controller, A is the output of the Astrom-Hagglund controller, R is a reference signal, and where:

$$E_{31}=\left|\log\left|T_r-T_u+\log\left|\frac{\log(|L|^L)}{T_u+1}\right|\right|\right|$$

$$E_{32}=NLM(\log|L|-(abs(L)^L)^2T_u^3(T_u+1)T_re^L-2T_ue^L)$$

$$E_{33}=NLM(\log|L|-2T_ue^L(2K_u(\log|K_ue^L|-\log|L|)T_u+K_ue^L))$$

and $$E_{34}=|\log|T_r+1||$$

and where $$NLM(x) = 10^0 \text{ if } x < -100 \text{ or } x > 100$$
$$10^{-\frac{100}{19} - \frac{1}{19}x} \text{ if } -100 \leq x < -5$$
$$10^{\frac{100}{19} - \frac{1}{19}x} \text{ if } 5 < x \leq 100$$
$$10^x \text{ if } -5 \leq x \leq 5$$

17. A control apparatus comprising:

an Astrom-Hagglund (A-H) controller operable to generate an A-H output;

a subsequent controller operable in response to the A-H output to generate a control variable to control operation of a plant, wherein the subsequent controller comprises at least one lead element responsive to the A-H output.

18. The control apparatus defined in claim 17 wherein the subsequent controller comprises at least one input and is operable to generate a control variable that is used as feedback to the input, such that the subsequent controller has internal feedback.

19. The control apparatus defined in claim 17 wherein the subsequent controller comprises at least one input and has an internal feedback loop that provides a signal to the at least one input, the signal being other than an output of the subsequent controller.

20. The control apparatus defined in claim 17 wherein the subsequent controller comprises a subtractor to generate a difference between the A-H output and an output of the subsequent controller.

21. The control apparatus defined in claim 17 wherein the subsequent controller has a transfer function defined as follows:

$$U = \frac{A(3 + 3L^2 E_{13} E_{14} E_{16} E_{17} + L^3 E_{11} E_{13} E_{14} E_{16} E_{17} + 3L(1 + E_{16} E_{17})) + (2 + 2L^2 E_{13} E_{14} E_{16} E_{17} + L(-1 + 2E_{16}) E_{17})R}{4 + L^3 (1 + E_{11}) E_{13} E_{14} E_{16} E_{17} + L^2 (1 + E_{14} + 2E_{13} E_{14}) E_{16} E_{17} + 2L(2 + E_{16} E_{17})}$$

where U is a controller output, A is a Astrom-Hagglund controller output, R is a reference signal, and L is a transfer function for the lag blocks used in the controller:

$$L = \frac{1}{1 + T_r * s}$$

and where:

$$E_{11} = 10^{e^{\log|\log|\log(eK_u * L)/L|}}$$

$$E_{13} = 10^{e^{\log|\log|K_u * L|}}$$

$$E_{14} = e^{\log|K_u/L|}$$

$$E_{16} = 10^{e^{\log|\log|K_u * L|}}$$

and $$E_{17} = e^{\log(K_u)}$$

22. The control apparatus defined in claim 17 wherein the subsequent controller has a transfer function defined as follows:

$$U = -\frac{-3R + A(-15 - 2/(1 + E_{25} * s) - 2/(1 + E_{28} * s))}{16 + \frac{1}{1 + E_{21} * s} - \frac{1}{1 + E_{22} * s} + \frac{1}{1 + E_{23} * s} + \frac{1}{1 + E_{24} * s} + \frac{1}{(1 + E_{25} * s)(1 + E_{26} * s)} + \frac{1}{(1 + E_{27} * s)(1 + E_{28} * s)}}$$

where U is an output of the subsequent controller, A is the output of the Astrom-Hagglund controller, R is a reference signal, and where:

$$E_{21} = \log|2T_r + K_u^L|$$

$$E_{22} = \text{abs}\left(\log\left(\text{abs}\left(T_r + K_u{}^{\wedge K_u{}^{\wedge}}\left(\frac{\frac{0.68631}{\frac{1}{0.13031}}}{K_u{}^{\wedge}\frac{T_u}{\log|\log|T_r + K_u{}^{(K_u^L)}|}} \cdot (K_u^L) \cdot T_u}\right)\right)\right)\right)$$

$$E_{23} = \log|2T_r + K_u^{\log|T_r + K_uL|}|$$

$$E_{24} = \log|T_r + K_u^L|$$

$$E_{25} = \|\log|T_r + \log(T_r + 1.2784)|\|$$

$$E_{26} = {}^{\log|T_r + (T_r + (x)^{\log|\log|K_u{}^{\wedge}L|})_r|}$$

where $$x = T_r + K_u^{\log|\log|T_r + K_uL|}$$

$$E_{27} = \log|T_r + (T_r + K_u^L)^L|$$

and $$E_{28} = \log|2T_r + K_u^L|$$

23. The control apparatus defined in claim 17 wherein the subsequent controller has a transfer function defined as follows:

$$U = \frac{R(1 + 3E_{34}(1 + E_{32} * s))(1 + E_{33} * s)) + A(10 + E_{34}(3 + E_{31} + 2E_{32} * s + E_{31} E_{32} * s)(1 + E_{33} * s))}{11 + E_{34}(2 + 3E_{32} * s)(1 + E_{33} * s)}$$

where U is the output of the subsequent controller, A is the output of the Astrom-Hagglund controller, R is a reference signal, and where:

$$E_{31} = \left|\log\left|T_r - T_u + \log\left|\frac{\log(|L|^L)}{T_u + 1}\right|\right|\right|$$

$$E_{32} = NLM(\log|L| - (\text{abs}(L)^L)^2 T_u^3 (T_u + 1) T_r e^L - 2T_u e^L)$$

$$E_{33} = NLM(\log|L| - 2T_u e^L (2K_u (\log|K_u e^L| - \log|L|) T_u + K_u e^L))$$

and $$E_{34} = \|\log|T_r + 1|\|$$

and where $$NLM(x) = 10^0 \text{ if } x < -100 \text{ or } x > 100$$
$$10^{-\frac{100}{19} - \frac{1}{19}x} \text{ if } -100 \leq x < -5$$
$$10^{\frac{100}{19} - \frac{1}{19}x} \text{ if } 5 < x \leq 100$$
$$10^x \text{ if } -5 \leq x \leq 5.$$

24. A control apparatus comprising:
   an Astrom-Hagglund (A-H) controller operable to generate an A-H output;
   a subsequent controller operable in response to the A-H output to generate a control variable to control operation of a plant, wherein the subsequent controller comprises at least one input and is operable to generate a control variable that is used as feedback to the input, such that the subsequent controller has internal feedback.

25. The control apparatus defined in claim 24 wherein the subsequent controller comprises at least one input and is operable to generate a control variable that is used as feedback to the input, such that the subsequent controller has internal feedback.

26. The control apparatus defined in claim 24 wherein the subsequent controller comprises at least one input and has an internal feedback loop that provides a signal to the at least one input, the signal being other than an output of the subsequent controller.

27. The control apparatus defined in claim 24 wherein the subsequent controller has a transfer function defined as follows:

$$U = \frac{\begin{array}{c}A(3 + 3L^2 E_{13} E_{14} E_{16} E_{17} + L^3 E_{11} E_{13} E_{14} E_{16} E_{17} + \\ 3L(1 + E_{16} E_{17})) + (2 + 2L^2 E_{13} E_{14} E_{16} E_{17} + \\ L(-1 + 2E_{16}) E_{17}) R\end{array}}{\begin{array}{c}4 + L^3 (1 + E_{11}) E_{13} E_{14} E_{16} E_{17} + L^2 (1 + E_{14} + \\ 2 E_{13} E_{14}) E_{16} E_{17} + 2L(2 + E_{16} E_{17})\end{array}}$$

where U is a controller output, A is a Astrom-Hagglund controller output, R is a reference signal, and L is a transfer function for the lag blocks used in the controller:

$$L = \frac{1}{1 + T_r * s}$$

and where:

$$E_{11} = 10^{e^{\log|\log|\log(eK_u * L)/L|}}$$

$$E_{13} = 10^{e^{\log|\log|K_u * L|}}$$

$$E_{14} = e^{\log|K_u/L|}$$

$$E_{16} = 10^{e^{\log|\log|K_u * L|}}$$

and $$E_{17} = e^{\log(K_u)}$$

28. The control apparatus defined in claim 24 wherein the subsequent controller has a transfer function defined as follows:

$$U = -\frac{-3R + A(-15 - 2/(1 + E_{25} * s) - 2/(1 + E_{28} * s))}{16 + \frac{1}{1 + E_{21} * s} - \frac{1}{1 + E_{22} * s} + \frac{1}{1 + E_{23} * s} + \frac{1}{1 + E_{24} * s} + \frac{1}{(1 + E_{25} * s)(1 + E_{26} * s)} + \frac{1}{(1 + E_{27} * s)(1 + E_{28} * s)}}$$

where U is an output of the subsequent controller, A is the output of the Astrom-Hagglund controller, R is a reference signal, and where:

$$E_{21} = \log|2T_r + K_u^L|$$

$$E_{22} = \text{abs}\left(\log\left(\text{abs}\left(T_r + K_u \wedge K_u \wedge \left(\frac{\frac{0.68631}{0.13031}}{K_u \wedge \frac{\log|\log|T_r + K_u(K_u^{L^L})|}{T_r + K_u \wedge \frac{1}{0.69897}} \cdot (K_u^L \cdot T_u)} \cdot T_r^L - T_u\right)\right)\right)\right)$$

$$E_{23} = \log|2T_r + K_u^{\log|T_r + K_u L|}|$$

$$E_{24} = \log|T_r + K_u^L|$$

$$E_{25} = \|\log|T_r + \log(T_r + 1.2784)|\|$$

$$E_{26} = \log|T_r + (T_r + (x)^{\log|\log|K_u * L|})^L|$$

where $$x = T_r + K_u^{\log|\log|T_r + K_u|}$$

$$E_{27} = \log|T_r + (T_r + K_u^L)^L|$$

and $$E_{28} = \log|2T_r + K_u^L|$$

29. The control apparatus defined in claim 24 wherein the subsequent controller has a transfer function defined as follows:

$$U = \frac{\begin{array}{c}R(1 + 3E_{34}(1 + E_{32} * s)(1 + E_{33} * s)) + \\ A(10 + E_{34}(3 + E_{31} + 2E_{32} * s + E_{31} E_{32} * s)(1 + E_{33} * s))\end{array}}{11 + E_{34}(2 + 3E_{32} * s)(1 + E_{33} * s)}$$

where U is the output of the subsequent controller, A is the output of the Astrom-Hagglund controller, R is a reference signal, and where:

$$E_{31} = \left|\log\left|T_r - T_u + \log\left|\frac{\log(|L|^L)}{T_u + 1}\right|\right|\right|$$

$$E_{32} = NLM(\log|L| - (\text{abs}(L)^L)^2 T_u^3 (T_u + 1) T_r e^L - 2T_u e^L)$$

$$E_{33} = NLM(\log|L| - 2T_u e^L (2K_u (\log|K_u e^L| - \log|L|) T_u + K_u e^L))$$

and $$E_{34} = \|\log|T_r + 1|\|$$

and where $$NLM(x) = 10^0 \quad \text{if } x < -100 \text{ or } x > 100$$
$$10^{-\frac{100}{19}-\frac{1}{19}x} \quad \text{if } -100 \leq x < -5$$
$$10^{\frac{100}{19}-\frac{1}{19}x} \quad \text{if } 5 < x \leq 100$$
$$10^x \quad \text{if } -5 \leq x \leq 5$$

30. A control apparatus comprising:
   an Astrom-Hagglund (A-H) controller operable to generate an A-H output;
   a subsequent controller operable in response to the A-H output to generate a control variable to control operation of a plant, wherein the subsequent controller comprises at least one input and has an internal feedback loop that provides a signal to the at least one input, the signal being other than an output of the subsequent controller.

31. The control apparatus defined in claim 30 wherein the subsequent controller comprises at least one input and is operable to generate a control variable that is used as feedback to the input, such that the subsequent controller has internal feedback.

32. The control apparatus defined in claim 30 wherein the subsequent controller comprises at least one input and has an internal feedback loop that provides a signal to the at least one input, the signal being other than an output of the subsequent controller.

33. The control apparatus defined in claim 30 wherein the subsequent controller has a transfer function defined as follows:

$$U = \frac{A(3 + 3L^2 E_{13}E_{14}E_{16}E_{17} + L^3 E_{11}E_{13}E_{14}E_{16}E_{17} + 3L(1 + E_{16}E_{17})) + (2 + 2L^2 E_{13}E_{14}E_{16}E_{17} + L(-1 + 2E_{16})E_{17})R}{4 + L^3(1 + E_{11})E_{13}E_{14}E_{16}E_{17} + L^2(1 + E_{14} + 2E_{13}E_{14})E_{16}E_{17} + 2L(2 + E_{16}E_{17})}$$

where U is a controller output, A is a Astrom-Hagglund controller output, R is a reference signal, and L is a transfer function for the lag blocks used in the controller:

$$L = \frac{1}{1 + T_r * s}$$

and where:

$$E_{11} = 10^{e^{\log|\log|\log(eK_u*L)/L||}}$$

$$E_{13} = 10^{e^{\log|\log|K_u*L|}}$$

$$E_{14} = e^{\log|K_u/L|}$$

$$E_{16} = 10^{e^{\log|\log|K_u*L|}}$$

and $$E_{17} = e^{\log(K_u)}$$

34. The control apparatus defined in claim 30 wherein the subsequent controller has a transfer function defined as follows:

$$U = -\frac{-3R + A(-15 - 2/(1 + E_{25}*s) - 2/(1 + E_{28}*s))}{16 + \frac{1}{1 + E_{21}*s} - \frac{1}{1 + E_{22}*s} + \frac{1}{1 + E_{23}*s} + \frac{1}{1 + E_{24}*s} + \frac{1}{(1 + E_{25}*s)(1 + E_{26}*s)} + \frac{1}{(1 + E_{27}*s)(1 + E_{28}*s)}}$$

where U is an output of the subsequent controller, A is the output of the Astrom-Hagglund controller, R is a reference signal, and where:

$$E_{21} = \log|2T_r + K_u^L|$$

$$E_{22} = \text{abs}\left(\log\left(\text{abs}\left(T_r + K_u\wedge K_u\wedge\left(\frac{\frac{0.68631}{\frac{1}{0.13031}\cdot T_r^L\cdot T_u}}{K_u\wedge\frac{T_u}{\log\left|\log\left|T_r+K_u(K_u^L)\right|\right|}\cdot(K_u^L)^L\cdot T_u}}\right)\right)\right)\right)$$

$$E_{23} = \log|2T_r + K_u{}^{\log|T_r+K_uL|}|$$

$$E_{24} = \log|T_r + K_u^L|$$

$$E_{25} = |\log|T_r + \log(T_r + 1.2784)||$$

$$E_{26} = {}^{\log}|T^{+(T_r+(x)^{\log|\log|K_u*L|})^L}|$$

where $$x = T_r + K_u{}^{\log|\log|T_r+K_uL||}$$

$$E_{27} = \log|T_r + (T_r + K_u^L)^L|$$

and $$E_{28} = \log|2T_r + K_u^L|$$

35. The control apparatus defined in claim 30 wherein the subsequent controller has a transfer function defined as follows:

$$U = \frac{R(1 + 3E_{34}(1 + E_{32}*s)(1 + E_{33}*s)) + A(10 + E_{34}(3 + E_{31} + 2E_{32}*s + E_{31}E_{32}*s)(1 + E_{33}*s))}{11 + E_{34}(2 + 3E_{32}*s)(1 + E_{33}*s)}$$

where U is the output of the subsequent controller, A is the output of the Astrom-Hagglund controller, R is a reference signal, and where:

$$E_{31} = \left|\log\left|T_r - T_u + \log\left|\frac{\log(|L|^L)}{T_u+1}\right|\right|\right|$$

$$E_{32} = NLM(\log|L| - (\text{abs}(L)^L)^2 T_u{}^3(T_u+1)T_r e^L - 2T_u e^L)$$

$$E_{33} = NLM(\log|L| - 2T_u e^L(2K_u(\log|K_u e^L| - \log|L|)T_u + K_u e^L))$$

and $$E_{34} = |\log|T_r + 1||$$

and where $$NLM(x) = 10^0 \quad \text{if } x < -100 \text{ or } x > 100$$

-continued $$10^{-\frac{100}{19}-\frac{1}{19}x} \text{ if } -100 \leq x < -5$$

$$10^{\frac{100}{19}-\frac{1}{19}x} \text{ if } 5 < x \leq 100$$

$$10^x \text{ if } -5 \leq x \leq 5$$

36. A control apparatus comprising:

an Astrom-Hagglund (A-H) controller operable to generate an A-H output;

a subsequent controller operable in response to the A-H output to generate a control variable to control operation of a plant, wherein the subsequent controller comprises a subtractor to generate a difference between the A-H output and an output of the subsequent controller.

37. The control apparatus defined in claim 36 wherein the subsequent controller comprises at least one input and is operable to generate a control variable that is used as feedback to the input, such that the subsequent controller has internal feedback.

38. The control apparatus defined in claim 36 wherein the subsequent controller comprises at least one input and has an internal feedback loop that provides a signal to the at least one input, the signal being other than an output of the subsequent controller.

39. The control apparatus defined in claim 36 wherein the subsequent controller has a transfer function defined as follows:

$$U = \frac{\begin{array}{c} A(3 + 3L^2 E_{13}E_{14}E_{16}E_{17} + L^3 E_{11}E_{13}E_{14}E_{16}E_{17} + \\ 3L(1 + E_{16}E_{17})) + (2 + 2L^2 E_{13}E_{14}E_{16}E_{17} + \\ L(-1 + 2E_{16})E_{17})R \end{array}}{\begin{array}{c} 4 + L^3(1 + E_{11})E_{13}E_{14}E_{16}E_{17} + L^2(1 + E_{14} + \\ 2E_{13}E_{14})E_{16}E_{17} + 2L(2 + E_{16}E_{17}) \end{array}}$$

where U is a controller output, A is a Astrom-Hagglund controller output, R is a reference signal, and L is a transfer function for the lag blocks used in the controller:

$$L = \frac{1}{1 + T_r * s}$$

and where:

$$E_{11} = 10^{e^{\log|\log(eK_u * L)/L|}}$$

$$E_{13} = 10^{e^{\log|\log|K_u * L|}}$$

$$E_{14} = e^{\log|K_u/L|}$$

$$E_{16} = 10^{e^{\log|\log|K_u * L|}}$$

and $$E_{17} = e^{\log(K_u)}.$$

40. The control apparatus defined in claim 36 wherein the subsequent controller has a transfer function defined as follows:

$$U = -\frac{-3R + A(-15 - 2/(1+E_{25}*s) - 2/(1+E_{28}*s))}{16 + \dfrac{1}{1+E_{21}*s} - \dfrac{1}{1+E_{22}*s} + \dfrac{1}{1+E_{23}*s} + \dfrac{1}{1+E_{24}*s} + \dfrac{1}{(1+E_{25}*s)(1+E_{26}*s)} + \dfrac{1}{(1+E_{27}*s)(1+E_{28}*s)}}$$

where U is an output of the subsequent controller, A is the output of the Astrom-Hagglund controller, R is a reference signal, and where:

$$E_{21} = \log|2T_r + K_u^L|$$

$$E_{22} = \text{abs}\left(\log\left(\text{abs}\left(T_r + K_u {}^{\wedge}K_u {}^{\wedge} \left(\frac{\frac{0.68631}{\frac{1}{0.13031}}}{K_u {}^{\wedge} \frac{T_u}{\log|\log|T_r + K_u(K_u^L)|}} \cdot T_r^L \cdot T_u \right) \cdot (K_u^L)^{L \cdot T_u} \right)\right)\right)$$

$$E_{23} = \log|2T_r + K_u^{\log|T_r + K_u LL|}|$$

$$E_{24} = \log|T_r + K_u^L|$$

$$E_{25} = ||\log|T_r + \log(T_r + 1.2784)||$$

$$E_{26} = {}^{\log|T_r + (T^{+(x)\log|\log|K_u 'L|})^L|}$$

where $$x = T_r + K_u^{\log|\log|T_r + K_u L|}$$

$$E_{27} = \log|T_r + (T_r + K_u^L)^L|$$

and $$E_{28} = \log|2T_r + K_u^L|$$

41. The control apparatus defined in claim 36 wherein the subsequent controller has a transfer function defined as follows:

$$U = \frac{\begin{array}{c}R(1 + 3E_{34}(1 + E_{32}*s)(1 + E_{33}*s)) + A(10 + E_{34}(3 + E_{31} + \\ 2E_{32}*s + E_{31}E_{32}*s)(1 + E_{33}*s))\end{array}}{11 + E_{34}(2 + 3E_{32}*s)(1 + E_{33}*s)}$$

where U is the output of the subsequent controller, A is the output of the Astrom-Hagglund controller, R is a reference signal, and where:

$$E_{31} = \left|\log\left|T_r - T_u + \log\left|\frac{\log(|L|^L)}{T_u + 1}\right|\right|\right|$$

$$E_{32} = NLM(\log|L| - (\text{abs}(L)^L)^2 T_u^3 (T_u+1) T_r e^L - 2T_u e^L)$$

$$E_{33} = NLM(\log|L| - 2T_u e^L (2K_u(\log|K_u e^L| - \log|L|) T_u + K_u e^L))$$

and $$E_{34} = ||\log|T_r + 1||$$

and where $$NLM(x) = 10^0 \text{ if } x < -100 \text{ or } x > 100$$
$$10^{\frac{100}{19} \cdot \frac{1}{19}x} \text{ if } -100 \leq x < -5$$
$$10^{\frac{100}{19} \cdot \frac{1}{19}x} \text{ if } 5 < x \leq 100$$
$$10^x \text{ if } -5 \leq x \leq 5$$

42. A controller comprising lag elements and proportional, derivative, integrative, adder, and subtractor elements whose output is the sum of two signals, the elements coupled together to generate a controller output in response to a reference signal the first of these two signals being a result of subtracting a result of applying a gain of 3 to the controller output from a result of applying a gain of 3 to the output of a Astrom-Hagglund controller, the second of these two signals being a sum of a result of applying a gain of 2 to a reference signal and the result of applying a lag parameterized by $T_r$ to a incoming signal, where $T_r$ is the time constant of the plant, said incoming signal being a result of subtracting the second of the two signals from a result of applying a gain of $e^{log(Ku)}$, where $K_u$ is the ultimate gain of the plant to the result of subtracting the reference signal from a result of applying gain of $10^{e^{log|log|K_u*L|}}$ to the sum of two earlier signals, the first of the two earlier signals being the result of a three-way subtraction in which the result of applying a gain of 2 to the controller output is subtracted from a sum of a result of applying gain of 3 to an output of the Astrom-Hagglund controller and a result of applying gain of 2 to the reference signal, the second of the two earlier signals being the result of applying a lag parameterized by $T_r$ to a result of subtracting the controller output from a result of applying a gain of $e^{log|K/L|}$, where L is the dead time of the plant, to the result of subtracting the controller output from the result of applying gain of $10^{e^{log|log|K_u*L|}}$ to a result of three-way subtraction in which a result of applying a gain of 2 to the controller output is subtracted from a sum of the result of applying a gain of 3 to the output of the Astrom-Hagglund controller and a sum of two intermediate signals, the first of the two intermediate signals being the result of applying a gain of 2 to the reference signal, the second of the two intermediate signals being the result of applying a lag parameterized by $T_r$ to a result of subtracting the controller output from the result of applying a gain of $10^{e^{log|log(eKu*L)/L|}}$ to the result of subtracting the controller output from the output of the Astrom-Hagglund controller.

43. A control apparatus comprising:

an Astrom-Hagglund (A-H) controller operable to generate an A-H output; a subsequent controller operable in response to the A-H output to generate a control variable to control operation of a plant, wherein the subsequent controller has a transfer function given by the equation $$U = \frac{A(3 + 3L^2 E_{13}E_{14}E_{16}E_{17} + L^3 E_{11}E_{13}E_{14}E_{16}E_{17} + 3L(1 + E_{16}E_{17})) + (2 + 2L^2 E_{13}E_{14}E_{16}E_{17} + L(-1 + 2E_{16})E_{17})R}{4 + L^3(1 + E_{11})E_{13}E_{14}E_{16}E_{17} + L^2(1 + E_{14} + 2E_{13}E_{14})E_{16}E_{17} + 2L(2 + E_{16}E_{17})}$$

where U is a controller output, A is a Astrom-Hagglund controller output, R is a reference signal, and L is a transfer function for the lag blocks used in the controller:

$$L = \frac{1}{1 + T_r * s}$$

and where:

$E_{11} = 10^{e^{log|log(eKu*L)/L|}}$ $E_{13} = 10^{e^{log|log|K_u*L|}}$ $E_{14} = e^{log|Ku/L|}$ $E_{16} = 10^{e^{log|log|K_u*L|}}$ and $E_{17} = e^{log(Ku)}$.

44. A control apparatus responsive to a reference signal to generate a control signal in response thereto to cause a plant to generate a plant output, the control signal being substantially the same to that produced by the controller having an Astrom-Hagglund (A-H) controller, operable to generate an A-H output, and a subsequent controller operable in response to the A-H output to generate a control variable to control operation of a plant, wherein the subsequent controller has a transfer function given by the following equation $$U = \frac{A(3 + 3L^2 E_{13}E_{14}E_{16}E_{17} + L^3 E_{11}E_{13}E_{14}E_{16}E_{17} + 3L(1 + E_{16}E_{17})) + (2 + 2L^2 E_{13}E_{14}E_{16}E_{17} + L(-1 + 2E_{16})E_{17})R}{4 + L^3(1 + E_{11})E_{13}E_{14}E_{16}E_{17} + L^2(1 + E_{14} + 2E_{13}E_{14})E_{16}E_{17} + 2L(2 + E_{16}E_{17})}$$

where U is a controller output, A is a Astrom-Hagglund controller output, R is a reference signal, and L is a transfer function for the lag blocks used in the controller:

$$L = \frac{1}{1+T_r*s}$$

and where:

$E_{11} = 10^{e^{\log|\log|\log(eK_u\cdot L)/L|}}$ $E_{13} = 10^{e^{\log|\log|K_u\cdot L|}}$ $E_{14} = e^{\log|K_u/L|}$ $E_{16} = 10^{e^{\log|\log|K_u\cdot L|}}$ and $E_{17} = e^{\log(K_u)}$.

45. A control apparatus to generate a control variable output, the control apparatus comprising:
   an Astrom-Hagglund (A-H) controller having an A-H output responsive to a reference signal and a plant output;
   a first gain block to apply a gain of three to the reference signal to generate a first gain output;
   a first subtractor to subtract the control variable output from the A-H output to generate a first subtractor output;
   a second gain block to apply a gain of fifteen to the first subtractor output to generate a second gain output;
   a first adder to add the first and second gain outputs to generate a first adder output;
   a first lag block to apply a lag parameterized by $$\text{abs}\left(\log\left(\text{abs}\left(T_r + K_u{}^{\wedge}K_u{}^{\wedge}\left(\frac{\frac{1}{\frac{0.68631}{T_u}}\cdot T_r^L\cdot T_u}{K_u{}^{\wedge}\frac{T_u}{\log|\log|T_r+K_u{}^{(K_u^L)}|\|}}\cdot (K_u^L)^L\cdot T_u\right)\right)\right)\right)$$

to the control variable output to generate a first lag output, where $K_u$ is the ultimate gain of the plant, where $T_u$ is the ultimate period of the plant, where L is the dead time of the plant, and where $T_r$ is the time constant of the plant;
   a second lag block to apply a lag parameterized by $\log|2T_r+K_u{}^L|$ to the control variable output to generate a second lag output;
   a second subtractor to subtract the second lag output from the first lag output to generate a second subtractor output;
   a third lag block to apply a lag parameterized by $\log|2T_r+K_u{}^{\log|T_r+KL|}|$ to the control variable output to generate a third lag output;
   a third subtractor to subtract the third lag output from the second subtractor output to generate a third subtractor output;
   a fourth lag block to apply a lag parameterized by $\log|T_r+K_u{}^L|$ to the control variable output to generate a fourth lag output;

a fourth subtractor to subtract the fourth lag output from the third subtractor output to generate a fourth subtractor output;
a third gain block to apply a gain of two to the A-H output to generate a third gain output;
a fifth lag block to apply a lag parameterized by $\log|T_r+(T_r+(x)^{\log|\log|K_u\cdot L|})^L|$ where $x=T_r+K_u{}^{\log|\log|T_r+K_uL|}$ to the control variable output to generate a fifth lag output;
a fifth subtractor to subtract the fifth lag output from the third gain output to generate a fifth subtractor output;
a sixth lag block to apply a lag parameterized by $|\log|T_r+\log(T_r+1.2784)||$ to the fifth subtractor output to generate a sixth lag output;
a seventh lag block to apply a lag parameterized by $\log|T_r+(T_r+K_u{}^L)^L|$ to the control variable output to generate a seventh lag output;
a sixth subtractor to subtract the seventh lag output from the third gain output to generate a sixth subtractor output;
a eighth lag block to apply a lag pararneterized by $\log|2T_r+K_u{}^L|$ to the sixth subtractor output to generate a eighth lag output;
a second adder to add the sixth lag output and the eighth lag output to generate a second adder output; and
a third adder to add the first adder output, the fourth subtractor output and the eighth lag output to generate the control variable output.

46. A control apparatus comprising:
an Astrom-Hagglund (A-H) controller operable to generate an A-H output;
a subsequent controller operable in response to the A-H output to generate a control variable to control operation of a plant, wherein the subsequent controller has a transfer function given by the following equation $$U = -\frac{-3R + A(-15 - 2/(1+E_{25}*s) - 2/(1+E_{28}*s))}{16 + \frac{1}{1+E_{21}*s} - \frac{1}{1+E_{22}*s} + \frac{1}{1+E_{23}*s} + \frac{1}{1+E_{24}*s} + \frac{1}{(1+E_{25}*s)(1+E_{26}*s)} + \frac{1}{(1+E_{27}*s)(1+E_{28}*s)}}$$

where U is the output of the controller, A is the output of the Astrom-Hagglund controller, R is the reference signal, and where:

$E_{21}=\log|2T_r+K_u{}^L|$ $$E_{22} = \text{abs}\left(\log\left(\text{abs}\left(T_r + K_u{}^{\wedge K_u{}^{\wedge}\frac{0.68631}{\frac{1}{0.13031} \cdot T_r^L \cdot T_u}}\right)\right)\right)$$

$E_{23}=\log|2T_r+K_u{}^{\log|T_r+K_uL|}|$ $E_{24}=\log|T_r+K_u{}^L|$ $E_{25}=\|\log|T_r+\log(T_r+1.2784)|\|$ $E_{26}={}^{\log|T_r+(T_r+(x)^{\log|\log|k_u{}'L|})^L|}$ where $x=T_r+K_u{}^{\log|\log|T_r+K_uL|\|}$ $E_{27}=\log|T_r+(T_r+K_u{}^L)^L|$ and $E_{28}=\log|2T_r+K_u{}^L|$ 47. A control apparatus responsive to a reference signal to generate a control signal in response thereto to cause a plant to generate a plant output, the control signal being substantially the same to that produced by the controller having an Astrom-Hagglund (A-H) controller, operable to generate an A-H output, and a subsequent controller operable in response to the A-H output to generate a control variable to control operation of a plant, wherein the subsequent controller has a transfer function given by the following equation $$U = -\frac{-3R + A(-15 - 2/(1+E_{25}*s) - 2/(1+E_{28}*s))}{16 + \frac{1}{1+E_{21}*s} - \frac{1}{1+E_{22}*s} + \frac{1}{1+E_{23}*s} + \frac{1}{1+E_{24}*s} + \frac{1}{(1+E_{25}*s)(1+E_{26}*s)} + \frac{1}{(1+E_{27}*s)(1+E_{28}*s)}}$$

where U is the output of the controller, A is the output of the Astrom-Hagglund controller, R is the reference signal, and where:

$E_{21}=\log|2T_r+K_u{}^L|$ $$E_{22} = \text{abs}\left(\log\left(\text{abs}\left(T_r + K_u{}^{\wedge K_u{}^{\wedge}\frac{0.68631}{\frac{1}{0.13031} \cdot T_r^L \cdot T_u}}\right)\right)\right)$$

$E_{23}=\log|2T_r+K_u{}^{\log|T_r+K_uL|}|$ $E_{24}=\log|T_r+K_u{}^L|$ $E_{25}=\|\log|T_r+\log(T_r+1.2784)|\|$ $E_{26}={}^{\log|T_r+(T_r+(x)^{\log|\log|k_u{}'L|})^L|}$ where $x=T_r+K_u{}^{\log|\log|T_r+K_uL|\|}$ and $E_{28}=\log|2T_r+K_u{}^L|$ 48. A control apparatus to generate a control variable output, the control apparatus comprising:

an Astrom-Hagglund (A-H) controller having an A-H output responsive to a reference signal and a plant output;

a first gain block to apply a gain of 3 to the reference signal to generate a first gain output;

a second gain block to apply a gain of $$\left|\log\left|T_r - T_u + \log\left|\frac{\log(|L|^L)}{T_u + 1}\right|\right|\right|$$

to the A-H output to generate a second gain output, where $T_u$ is the ultimate period of the plant, where L is the dead time of the plant, and where $T_r$ is the time constant of the plant;

a first subtractor to subtract the control variable output from the second gain output to generate a first subtractor output;

a third gain block to apply a gain of 2 to the A-H output to generate a third gain output;

a fourth gain block to apply a gain of 2 to the control variable output to generate a fourth gain output;

a second subtractor to subtract the fourth gain output from the third gain output to generate a second subtractor output;

a first adder to add the first gain output, the first subtractor output and the second subtractor output to generate a first adder output;

a first lead block to apply a lead parameterized by $\text{NLM}(\log|L|-(\text{abs}(L)^L)^2 T_u{}^3(T_u+1)T_e{}^L-2T_u e^L)$ to the first adder output to generate a first lead output;

a second adder to add the first lead output, the A-H output and the control variable output to generate a second adder output;

a second lead block to apply a lead parameterized by $\text{NLM}(\log|L|-2T_u e^L(2K_u(\log|K_u e^L|-\log|L|)T_u+K_u e^L))$, to the second adder output to generate a second lead output, where $K_u$ is the ultimate gain of the plant;

a fifth gain block to apply a gain of $\|\log|T^r+1|\|$, to the second lead output to generate a fifth gain output;

a third subtractor to subtract the control variable output from the A-H output to generate a third subtractor output;

a sixth gain block to apply a gain of ten to the third subtractor output to generate a sixth gain output; and a third adder to add the reference signal, the fifth gain output, and the sixth gain output to generate the control variable output.

49. A control apparatus comprising;

an Astrom-Hagglund (A-H) controller operable to generate an A-H output;

a subsequent controller operable in response to the A-H output to generate a control variable to control operation of a plant, wherein the subsequent controller has a transfer function given by the following equation $$U = \frac{R(1+3E_{34}(1+E_{32}*s)(1+E_{33}*s)) + A(10+E_{34}(3+E_{31}+2E_{32}*s+E_{31}E_{32}*s)(1+E_{33}*s))}{11+E_{34}(2+3E_{32}*s)(1+E_{33}*s)}$$

where U is an output of the subsequent controller, A is an output of the Astrom-Hagglund controller, R is a reference signal, and where $$E_{31} = \left|\log\left|T_r - T_u + \log\left|\frac{\log(|L|^L)}{T_u+1}\right|\right|\right|$$

$E_{32}$=NLM(log|L|−(abs(L)$^L$)$^2T_u^3(T_u+1)T_r e^L − 2T_u e^L$)

$E_{33}$=NLM(log|L|−2$T_u e^L$(2$K_u$(log|$K_u e^L$|−log|L|)$T_u + K_u e^L$))

and $E_{34}$|log|$T_r$+1‖ and where $NLM(x) = 10^0$ if $x < -100$ or $x > 100$
$10^{\frac{100}{19} - \frac{1}{19}x}$ if $-100 \le x < -5$
$10^{-\frac{100}{19} - \frac{1}{19}x}$ if $5 < x \le 100$
$10^x$ if $-5 \le x \le 5$.

50. A control apparatus responsive to a reference signal to generate a control signal in response thereto to cause a plant to generate a plant output, the control signal being substantially the same to that produced by the controller having an Astrom-Hagglund (A-H) controller, operable to generate an A-H output, and a subsequent controller operable in response to the A-H output to generate a control variable to control operation of a plant, wherein the subsequent controller has a transfer function given by the following equation $$U = \frac{R(1+3E_{34}(1+E_{32}*s)(1+E_{33}*s)) + A(10+E_{34}(3+E_{31}+2E_{32}*s+E_{31}E_{32}*s)(1+E_{33}*s))}{11+E_{34}(2+3E_{32}*s)(1+E_{33}*s)}$$

where U is an output of the subsequent controller, A is an output of the Astrom-Hagglund controller, R is a reference signal, and where $$E_{31} = \left|\log\left|T_r - T_u + \log\left|\frac{\log(|L|^L)}{T_u+1}\right|\right|\right|$$

$E_{32}$=NLM(log|L|−(abs(L)$^L$)$^2T_u^3(T_u+1)T_r e^L − 2T_u e^L$)

$E_{33}$=NLM(log|L|−2$T_u e^L$(2$K_u$(log|$K_u e^L$|−log|L|)$T_u + K_u e^L$))

and $E_{34}$=‖log|$T_r$+1‖ and where $NLM(x) = 10^0$ if $x < -100$ or $x > 100$
$10^{-\frac{100}{19} - \frac{1}{19}x}$ if $-100 \le x < -5$
$10^{\frac{100}{19} - \frac{1}{19}x}$ if $5 < x \le 100$
$10^x$ if $-5 \le x \le 5$

* * * * *